US010523646B2

(12) United States Patent
Ackerly

(10) Patent No.: US 10,523,646 B2
(45) Date of Patent: Dec. 31, 2019

(54) METHODS AND SYSTEMS FOR DISTRIBUTING ENCRYPTED CRYPTOGRAPHIC DATA

(71) Applicant: Virtru Corporation, Washington, DC (US)

(72) Inventor: William R. Ackerly, Washington, DC (US)

(73) Assignee: Virtru Corporation, Washington, DC (US)

(*) Notice: Subject to any disclaimer, the term of this patent is extended or adjusted under 35 U.S.C. 154(b) by 242 days.

(21) Appl. No.: 15/238,752

(22) Filed: Aug. 17, 2016

(65) Prior Publication Data

US 2017/0063816 A1    Mar. 2, 2017

Related U.S. Application Data

(60) Provisional application No. 62/305,704, filed on Mar. 9, 2016, provisional application No. 62/208,839, filed on Aug. 24, 2015.

(51) Int. Cl.
 *H04L 29/06* (2006.01)
(52) U.S. Cl.
 CPC ........ *H04L 63/062* (2013.01); *H04L 63/0428* (2013.01)
(58) Field of Classification Search
 CPC .................................................. H04L 63/062
 USPC .......................................................... 713/171
 See application file for complete search history.

(56) References Cited

U.S. PATENT DOCUMENTS

| 7,774,411 | B2 | 8/2010 | Lemay |
| 7,844,832 | B2 | 11/2010 | Nation |
| 7,913,311 | B2 | 3/2011 | Alain |
| 7,921,288 | B1 | 4/2011 | Hildebrand |

(Continued)

FOREIGN PATENT DOCUMENTS

| EP | 1903467 A2 | 3/2008 |
| WO | 2008100264 A2 | 8/2008 |
| WO | 2008100264 A3 | 7/2009 |

OTHER PUBLICATIONS

Advisory Action in U.S. Appl. No. 13/340,732 dated Sep. 9, 2013, 3 pages.

(Continued)

*Primary Examiner* — Jacob Lipman
(74) *Attorney, Agent, or Firm* — Cynthia M. Gilbert; Blueshift IP, LLC

(57) ABSTRACT

A method for distributing encrypted cryptographic data includes receiving, by a key service, from a first client device, a request for a first public key. The method includes transmitting, by the key service, to the first client device, the first public key. The method includes receiving, by the key service, from an access control management system, an encryption key encrypted with the first public key and a request from a second client device for access to the encryption key. The method includes decrypting, by the key service, the encrypted encryption key, with a private key corresponding to the first public key. The method includes encrypting, by the key service, the decrypted encryption key, with a second public key received from the second computing device. The method includes transmitting, by the key service, to the second client device, the encryption key encrypted with the second public key.

7 Claims, 11 Drawing Sheets

(56) References Cited

U.S. PATENT DOCUMENTS

| | | | |
|---|---|---|---|
| 7,921,450 B1 | 4/2011 | Vainstein | |
| 9,083,529 B1 | 7/2015 | Statica | |
| 2002/0049679 A1 | 4/2002 | Russell | |
| 2002/0091782 A1 | 7/2002 | Benninghoff | |
| 2003/0149781 A1 | 8/2003 | Yared | |
| 2004/0034776 A1 | 2/2004 | Fernando | |
| 2004/0186997 A1 | 9/2004 | Todaka | |
| 2005/0187966 A1 | 8/2005 | Iino | |
| 2006/0005000 A1 | 1/2006 | King | |
| 2007/0043680 A1 | 2/2007 | Fox | |
| 2007/0074270 A1 | 3/2007 | Meehan | |
| 2007/0118735 A1 | 5/2007 | Cherrington | |
| 2008/0005024 A1 | 1/2008 | Kirkwood | |
| 2008/0086646 A1 | 4/2008 | Pizano | |
| 2008/0151110 A1 | 6/2008 | Hasegawa | |
| 2008/0307530 A1 | 12/2008 | Lee | |
| 2008/0313699 A1 | 12/2008 | Starostin | |
| 2009/0055924 A1 | 2/2009 | Trotter | |
| 2009/0086646 A1 | 4/2009 | Kuchibhotla | |
| 2009/0106549 A1 | 4/2009 | Mohamed | |
| 2009/0106788 A1 | 4/2009 | Nochimowski | |
| 2010/0153739 A1 | 6/2010 | Guymon, Jr. | |
| 2010/0199105 A1 | 8/2010 | Lee | |
| 2011/0040964 A1 | 2/2011 | Nussbaum | |
| 2011/0040967 A1 | 2/2011 | Waller | |
| 2012/0179905 A1* | 7/2012 | Ackerly | G06F 21/6218 713/155 |
| 2014/0089658 A1* | 3/2014 | Raghuram | H04L 9/0825 713/155 |

OTHER PUBLICATIONS

Communication under Rule 71(3) EPC Intention to Grant in European Patent Office Application No. 11855869.1, dated Jul. 7, 2015, 5 pages.

Communication under Rule 71(3) EPC Intention to Grant in European Patent Office Application No. 15191773.9, dated Apr. 28, 2017, 5 pages.

Erol Koc, et al., "PACISSO: P2P Access Control Incorporating Scalability and Self-Organization for Storage Systems," SMLI TR-2007-154, Sun Microsystems, Jun. 2007.

European Search Report dated Nov. 29, 2017 in European patent application No. 17187647.7.

Examination Report No. 1 in Australian Patent Application No. 2016201462, dated Dec. 13, 2016, 2 pages.

Examination Report No. 1 in Australian Patent Application No. 2017219140, dated Sep. 10, 2018, 9 pages.

Extended European Search Report and Written Opinion for 11855869.1, dated Aug. 20, 2014, 6 pages.

Extended European Search Report and Written Opinion for Application No. 15191773.9, dated Apr. 8, 2016, 14 pages.

Final Rejection in U.S. Appl. No. 13/340,732 dated Jun. 27, 2013, 21 pages.

First Examination Report in Canadian Patent Application No. 2821916, dated Aug. 4, 2017, 5 pages.

International Preliminary Report on Patentability for PCT/US2011/068019, dated Jul. 16, 2013, 5 pages.

International Search Report and Written Opinion for PCT/US2011/068019, dated Aug. 30, 2012, 9 pages.

Nobelis et al., "Decentralized Access Right Management for Workflow Applications," 2005, https://nyx.unice.fr/publis/nobelis-boudaoud-etal:2005.pdf.

Non-Final Rejection for U.S. Appl. No. 14/949,087, dated Jun. 9, 2016, 20 pages.

Non-Final Rejection for U.S. Appl. No. 14/489,604, dated Apr. 16, 2015, 9 pages.

Non-Final Rejection in U.S. Appl. No. 13/340,732 dated Feb. 1, 2013, 26 pages.

Notice of Acceptance in Australian Patent Application No. 2016201462, dated Jun. 13, 2017, 3 pages.

Notice of Allowance for U.S. Appl. No. 14/489,604, dated Sep. 1, 2015, 8 pages.

Notice of Allowance in Canadian Patent Application No. 2821916, dated Jun. 11, 2018, 1 page.

Notice of Allowance in U.S. Appl. No. 14/949,087, dated Oct. 27, 2016, 10 pages.

Notice of Allowance in U.S. Appl. No. 13/340,732 dated Sep. 27, 2013, 17 pages.

Notice of Allowance dated Jun. 18, 2014 in U.S. Appl. No. 14/064,274, 13 pages.

Notification of Allowance of Amendment to Specification in Australian Patent Application No. 2011354630, dated Mar. 10, 2016, 1 page.

Partial European Search Report for 15191773.9 dated Feb. 15, 2016, 7 pages.

Patent Examination Report No. 1 in Australian Patent Application No. 2011354630, dated Sep. 3, 2015, 21 pages.

Ravi Sandhu et al., "Peer-to-Peer Access Control Architecture using Trusted Computing Technology," ACM, SACMAT=05, Jun. 1-3, 2005, Stockholm, Sweden, 2005.

Communication pursuant to Article 94(3) EPC, dated Jul. 12, 2019, in European Patent Application No. 17187647.7, 4 pages.

Examination Report No. 2 in Australian Patent Application No. 2017219140, dated Apr. 1, 2019, 7 pages.

First Examination Report, dated May 8, 2019, in Indian Patent Application No. 1198/MUMNP/2013, 6 pages.

U.S. Appl. No. 13/340,732, filed Dec. 30, 2011.
U.S. Appl. No. 14/064,274, filed Oct. 28, 2013.
U.S. Appl. No. 14/489,604, filed Sep. 18, 2014.
U.S. Appl. No. 14/949,087, filed Nov. 23, 2015.

* cited by examiner

METHODS AND SYSTEMS FOR DISTRIBUTING ENCRYPTED CRYPTOGRAPHIC DATA

CROSS-REFERENCE TO RELATED APPLICATIONS

This application claims priority from U.S. Provisional Patent Application Ser. No. 62/208,839, filed on Aug. 24, 2015, entitled "Methods and Systems for Distributing Controlled Cryptographic Data," and from U.S. Provisional Patent Application Ser. No. 62/305,704, filed on Mar. 9, 2016, entitled "Methods and Systems for Distributing Cryptographic Data in a Public Key-Based Key Retargeting Architecture," each of which is hereby incorporated by reference.

BACKGROUND

The disclosure relates to distributing encrypted cryptographic data. More particularly, the methods and systems described herein relate to distributing cryptographic data in an architecture in which the sender of encrypted data controls one or more cryptographic keys.

Conventional systems for digital rights management are typically proprietary systems that provide functionality for securing—e.g., via one or more of encrypting, controlling access, and authenticating—shared data objects stored within the system and accessed by users of the system. However, such systems do not typically extend to securing data objects once the data objects are shared with individuals external to the system or for securing data objects created outside the system.

Although individuals may implement cryptographic functions without the use of a digital rights management system, such functions typically require a level of technical sophistication unavailable to the average individual. Further, even for sophisticated users, there are a number of well-known drawbacks to standard cryptographic techniques. For example, symmetric key cryptography (e.g., the Advanced Encryption Standard (AES) in the United States) allows for password-protection of data objects but does not prevent authorized users from sharing the password with unauthorized users and is reliant upon the strength of the password.

SUMMARY

In one aspect, a method for distributing encrypted cryptographic data includes receiving, by a key service, from a first client device, a request for a first public key. The method includes transmitting, by the key service, to the first client device, the first public key. The method includes receiving, by the key service, from an access control management system, an encryption key encrypted with the first public key and a request from a second client device for access to the encryption key. The method includes decrypting, by the key service, the encrypted encryption key, with a private key corresponding to the first public key. The method includes encrypting, by the key service, the decrypted encryption key, with a second public key received from the second computing device. The method includes transmitting, by the key service, to the second client device, the encryption key encrypted with the second public key.

BRIEF DESCRIPTION OF THE DRAWINGS

Certain objects, aspects, features, and advantages of the disclosure will become more apparent and better understood by referring to the following description taken in conjunction with the accompanying drawings, in which.

DETAILED DESCRIPTION

In some embodiments, the methods and systems described herein relate to distributing encrypted data. Before describing these methods and systems in detail, however, a description is provided of a network in which such methods and systems may be implemented.

Figure 1A:
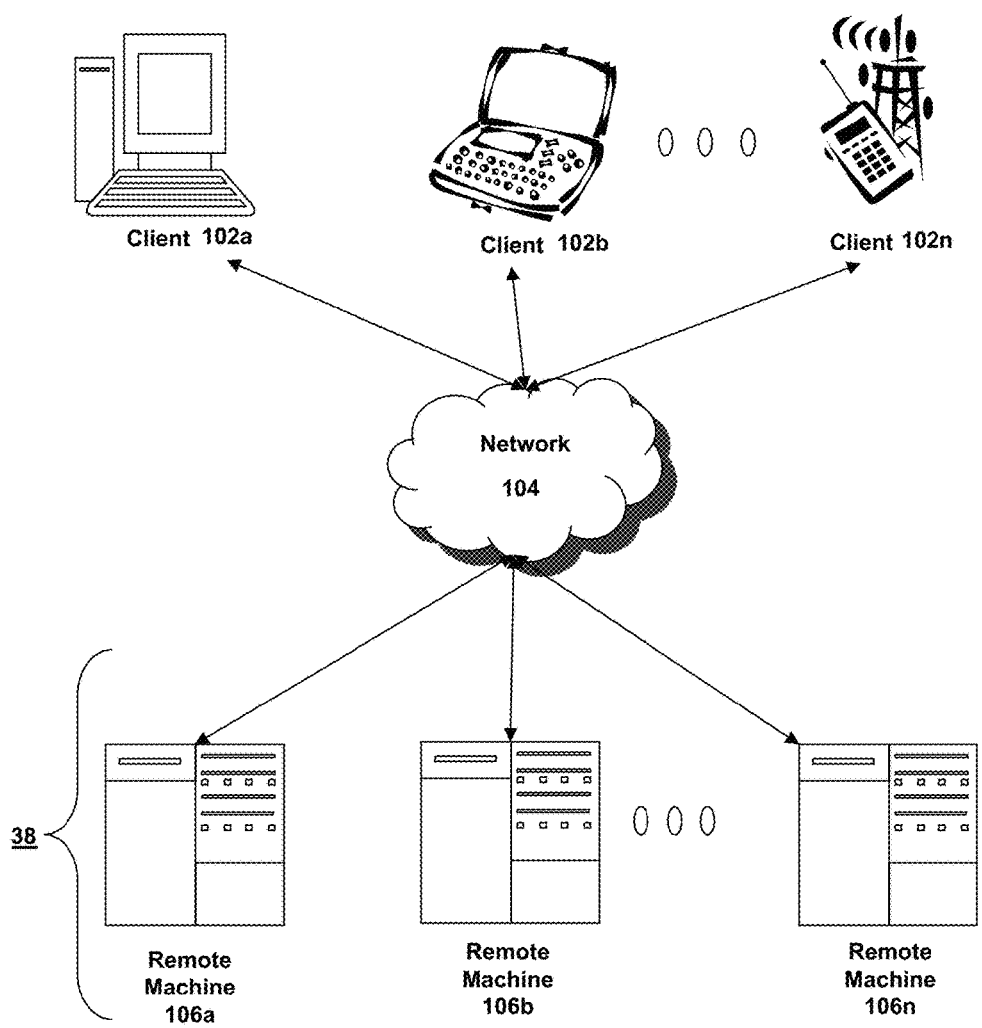
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, machine(s) 102, endpoint(s) 102, or endpoint node(s) 102) in communication with one or more remote machines 106a-106n (also generally referred to as server(s) 106, machine(s) 106, or computing device(s) 106) via one or more networks 104.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems, of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
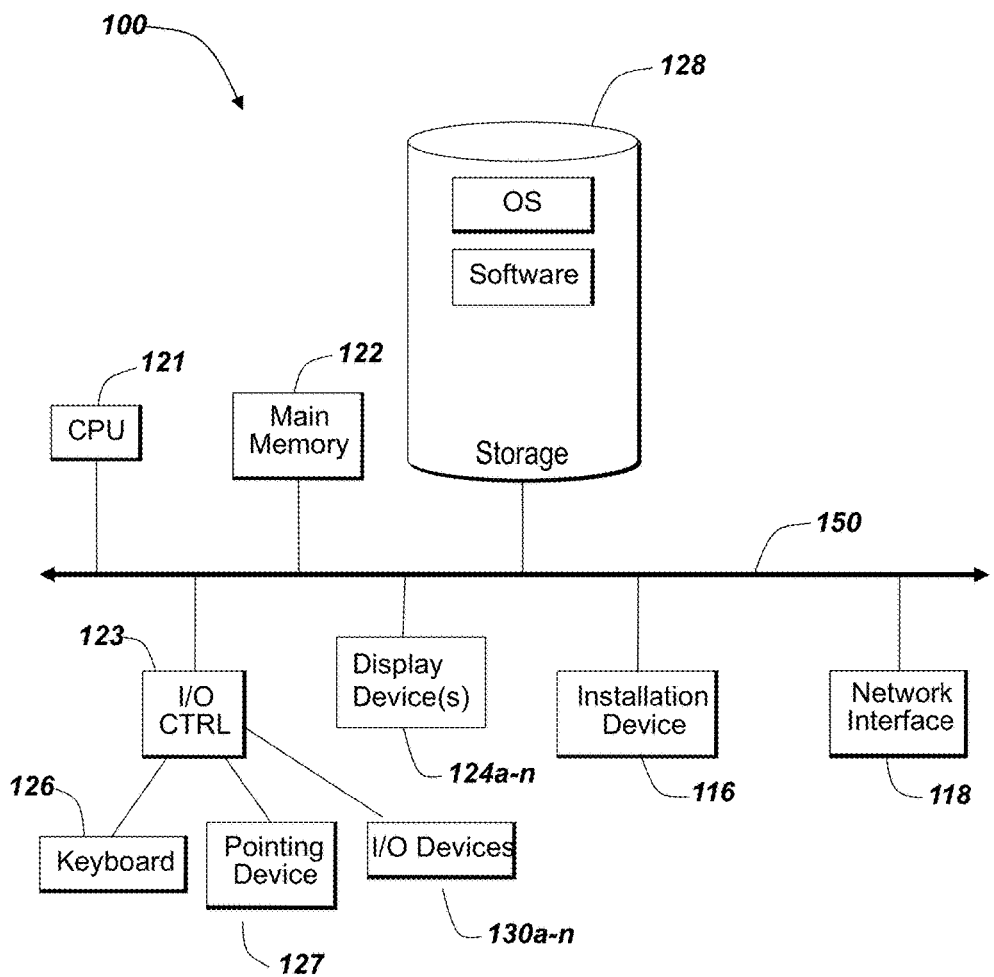
Figure 1C:
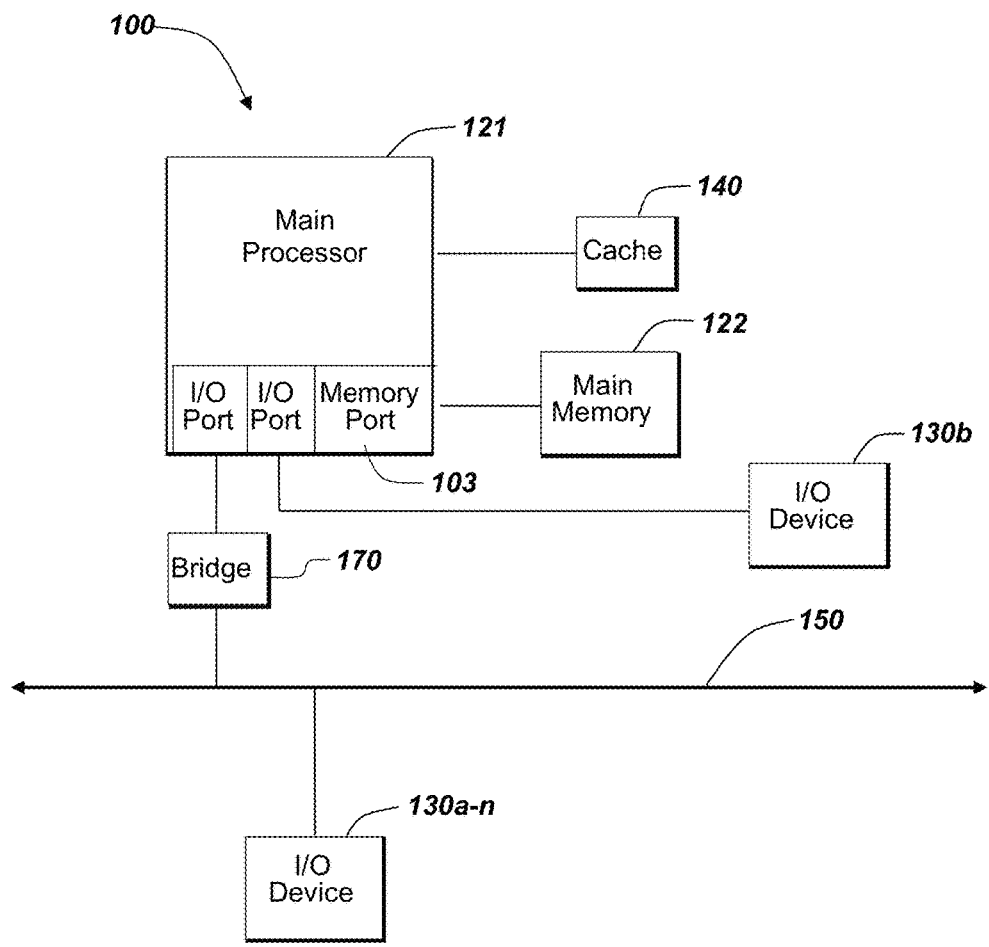

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124*a-n*, a keyboard 126, a pointing device 127, such as a mouse, and one or more other I/O devices 130*a-n*. The storage device 128 may include, without limitation, an operating system and software. As shown in FIG. 1C, each computing device 100 may also include additional optional elements, such as a memory port 103, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130*b* via, for example, HYPERTRANSPORT, RAPIDIO, or INFINIBAND communications technology.

A wide variety of I/O devices 130*a*-130*n* may be present in the computing device 100. Input devices include keyboards, mice, trackpads, trackballs, microphones, scanners, cameras and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7 and WINDOWS VISTA, all of which are manufactured by Microsoft Corporation of Redmond, Wash.; MAC OS, manufactured by Apple Inc. of Cupertino, Calif.; OS/2, manufactured by International Business Machines of Armonk, N.Y.; or any type and/or form of a UNIX operating system.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc. of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is device in the IPHONE smartphone line of devices, manufactured by Apple Inc. of Cupertino, Calif. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices, manufactured by Apple Inc.; the PLAYBOOK, manufactured by Research in Motion; the CRUZ line of devices, manufactured by Velocity Micro, Inc. of Richmond, Va.; the FOLIO and THRIVE line of devices, manufactured by Toshiba America Information Systems, Inc. of Irvine, Calif.; the GALAXY line of devices, manufactured by Samsung; the HP SLATE line of devices, manufactured by Hewlett-Packard; and the STREAK line of devices, manufactured by Dell, Inc. of Round Rock, Tex.

In one embodiment, the methods and systems described herein provide functionality allowing a user to specify individuals who may access a data object regardless of whether the recipients are members of the same access control management system as the user. In another embodiment, the methods and systems described herein provide functionality allowing a user to distribute a secured data object via a non-secured channel and distribute the cryptographic data for accessing the secured data object via a separate, secure channel, where authentication, access control, and establishment of the secure channel is implemented by an access control management system; an authorized recipient can authenticate himself through a third-party identity provider, receive delivery of cryptographic data from the access control management system, and access the data object. In such an embodiment, the methods and systems described herein provide for the decoupling of access control and authentication from data storage and distribution.

Furthermore, the methods and systems described herein provide functionality allowing the sender of the secured data object to maintain control over the cryptographic data used to secure the data object. In one embodiment, the sender of the secured data object maintains control over the cryptographic data by encrypting the cryptographic data with a public key, thus ensuring that a recipient of the cryptographic data needs to use a corresponding private key (which may be either the sender's or the recipient's, depending on which public key the sender used) in order to access the cryptographic data.

Furthermore, the methods and systems described herein provide functionality for enabling the sender of the secured data object to maintain control over the distribution of the secured data object and the cryptographic data. By way of example, in some scenarios, a recipient of the secured data object may forward the secured data object to a third party; the methods and systems described herein provide functionality allowing the original sender of the secured data object to maintain control over both (i) the cryptographic data used to secure the data object and (ii) whether and how the third party accesses the secured data object.

Figure 2:
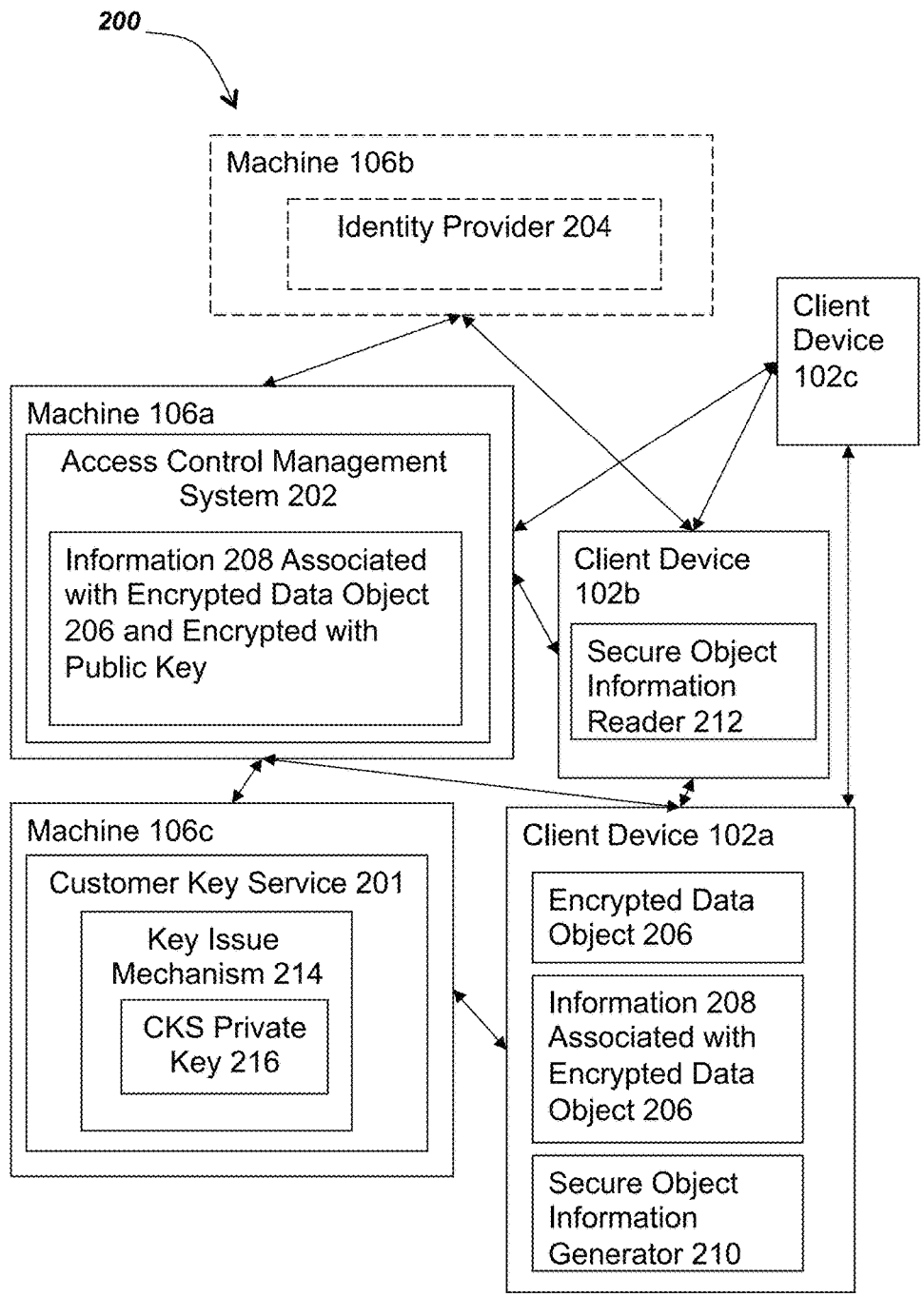
FIG. 2 is a block diagram depicting an embodiment of a system for distributing cryptographic data.

Referring now to FIG. 2, a block diagram depicts one embodiment of a system for distributing cryptographic data to authenticated recipients. In brief overview, the system includes an access control management system 202, machines 106a-c, client devices 102a-c, an encrypted data object 206, information 208 associated with the encrypted data object 206, a secure object information generator 210, a secure object information reader 212, a key issue mechanism 214, and a private key 216. In one embodiment, the key issue mechanism 214 executes on a machine 106c. In another embodiment, the key issue mechanism 214 is provided as part of the secure object information generator 210.

The client devices 102a-c may be clients 102 as described above in connection with FIGS. 1A-C. The access control management system 202 may execute on a machine 106a. The machines 106a-c may be remote machines 106, as described above in connection with FIGS. 1A-C. The machines 106 and client devices 102 may exchange data via networks 104 as described above in connection with FIGS. 1A-1C. The system 200 may include an identity provider 204 executing on a machine 106b. Alternatively, a third party may provide the identity provider 204.

In one embodiment, the client device 102a includes a secure object information generator 210. The secure object information generator 210 may be provided as a software application executing on the client device 102a and a user of the client device 102a may use the secure object information generator 210 to generate the information 208 associated with the encrypted data object 206; for example, and without limitation, the secure object information generator 210 may be provided as a stand-alone software application or as a plug-in or add-on to software executing on the client device 102a. In another embodiment, the user of the client device 102a executes the secure object information generator 210 to encrypt a document or other data object, thus generating the encrypted data object 206.

In one embodiment, a data object may be a document of any type, media file of any type, or other data object. In another embodiment, the data object is data in a format that natively supports encryption (e.g., PDF, compressed files, files generating using a word processing application such as, by way of example the MICROSOFT WORD application). In still another embodiment, the data object is data in a format that does not natively support encryption.

In one embodiment, the encrypted data object 206 includes a document in a self-describing format (e.g., an eXtended Markup Language (XML) format) that supports strong symmetric encryption, digital signatures via asymmetric encryption, unique identifiers, and data objects (e.g., documents, images multimedia, Portable Document Format (PDF) documents). In another embodiment, an encrypted data object 206 includes a unique identifier, a display name, and an identification of a type of the data object.

In some embodiments, the encrypted data object 206 includes an identifier of the access control management system 202. In one of these embodiments, the secure object information generator 210 includes the identifier (which may be provided, for example, and without limitation, as a uniform resource locator) and the computing device 102b uses the identifier to request the information 208 from the access control management system 202. In another of these embodiments, the identifier of the access control management system 202 is included in an unencrypted portion of the encrypted data object 206, such as an unencrypted header.

In some embodiments, the secure object information generator 210 includes functionality for encrypting data objects. In one of these embodiments, the secure object information generator 210 includes at least one encryption engine for encrypting or decrypting data objects. In other embodiments, the secure object information generator 210 generates an identifier for the encrypted data object 210 and includes the identifier in the information 208 that is transmitted to the access control management system 202. In other embodiments, the secure object information generator 210 requests that the access control management system 202 generate an identifier for the encrypted data object 206.

In one embodiment, the secure object information generator 210 processes a data object to generate an encrypted data object 206 and information 208 associated with the encrypted data object 206. The information 208 may be, for example, a registration payload containing information such as an encryption key (which itself may be encrypted) used to encrypt the data object 206 and an access control list specifying users who may receive the encryption key to decrypt the data object 206. In one embodiment, the information 208 includes at least one identification of a user authorized to receive the encryption key; for example, the information 208 includes an email address for each authorized user. In another embodiment, the information 208 includes only the encryption key used to encrypt the data object 206. The encryption key may itself by encrypted using a public key (e.g., a public key of the sender or of the recipient).

In some embodiments, the information 208 includes an identifier of computing devices that are authorized to receive the information 208. For example, the user of the first computing device 102a may specify that a second user may receive the information 208 only at a specific machine (for example, prohibiting the second user from accessing the information 208 from a mobile device or public kiosk); alternatively, the user of the first computing device 102*a* may specify that any user of a particular machine may access the information 208 (for example, allowing all members of a department including a secured machine may access the information 208). In one of these embodiments, the information 208 includes an identification of an authorized machine that may be any machine 102 or 106 as described above in connection with FIGS. 1A-1C. In another of these embodiments, the information 208 includes an identification of an authorized machine that complies with the Trusted Platform Module Specification promulgated by the Trusted Computing Group of Beaverton, Oreg. In still another of these embodiments, when authorizing a machine compliant with the Trusted Platform Module Specification as a recipient of the information 208, a user of the first computing device 102*a* may indicate that the access control management system 202 need not authenticate users of the authorized machine because the machine itself has certain properties that allows the user to trust that the machine has been secured.

In one embodiment, the information 208 includes an authorized user group instead of or in addition to authorizing a specific user; for example, the information 208 may specify a particular department, company, entity, or other plurality of users authorized to receive the information 208. In another embodiment, the information 208 includes an indication that an authorized user may delegate access; for example, a sending user may specify that a receiving user (such as a doctor) may delegate access to other users (such as a nurse, hospital administrator, resident, or other colleague) and the sending user may specify characteristics of authorized individuals to which the authorized user may delegate access (e.g., anyone with an email address ending in "@HypotheticalHospital.org").

In some embodiments, the information 208 includes a time-based restriction; for example, a user may specify that an identified second user may receive the information 208 within certain time periods (e.g., during a presentation, a consultation, a joint venture, and an arbitrary time frame). The information 208 may be generated separately from the encrypted data object 206 and transmitted separately from the encrypted data object 206.

In one embodiment, the information 208 includes a specification of data rights protection mechanisms to execute for the encrypted data object 206, including whether the encrypted data object 206 is permitted to be copied, pasted, forwarded by email or otherwise distributed to other unauthorized recipients, printed and/or screen-printed with or without embedding hidden "watermarks" in the data object for use in tracing information back to an application that opened the data object 206, each of which are functions that the system is able to prohibit when the encrypted data object 206 is later opened by an authorized user. For example, the user of the first computing device 102*a* may prevent "print screen" in operating systems that otherwise support the print screen function; if the user wishes to prevent print screen, instructions to activate an existing digital rights management program including such countermeasures can be included in the information 208, in which case the countermeasure will be activated when an authorized recipient user decrypts the encrypted data object 206.

In some embodiments, a secure object information reader 212 allows a user of the client device 102*b* to access information 208 generated by the secure object information generator 210. In some embodiments, and as will be described in greater detail below, the secure object information reader 212 includes functionality allowing a user to communicate with the access control management system 202 and the identity provider 204 to authenticate himself in order to receive information 208. In other embodiments, the secure object information generator 210 includes at least one encryption engine for encrypting or decrypting data objects. In further embodiments, the secure object information generator 210 and the secure object information reader 212 are provided as application plug-ins, web services, or stand-alone applications. As will be understood by one of ordinary skill in the art, the secure object information generator 210 and the secure object information reader 212 may each include the functionality of the other. For example, in one embodiment, the secure object information reader 212 includes functionality for implementing asymmetric encryption algorithms to, for example, generate public-private key pairs.

The access control management system 202 enables access control using decentralized identity management, relying on external identity providers to authenticate user identity. In one embodiment, the access control management system 202 includes functionality for accessing information 208 generated by a secure object information generator 210*a*. For example, the access control management system 202 may include a secure object information reader 212 (or a modified such reader 212) that receives and processes the information 208.

In one embodiment, the access control management system 202 includes an identity provider selector (not shown) identifying a plurality of identity providers 204 and selecting one of the plurality of identity providers 204 for authentication of a user of a client device 102*b*. For example, the identity provider selector may receive an enumeration of user identifiers from the secure object information reader 212 and analyze each enumerated user identifier in the enumeration to determine which identity providers 204 to access for authentication of each enumerated user identifier; for instance, by analyzing a domain name included in the user identifier and querying a database to identify an identity provider 204 associated with the analyzed domain name. In another embodiment, the access control management system 202 uses an interface to the identity provider 204 through which the access control management system 202 may make authentication requests. For example, the access control management system 202 may establish an interface to an identity provider 204 that provides an interface according to a federated identity standard such as OpenID, Information Card (InfoCard), or SAML standards. In still another embodiment, the access control management system 202 includes functionality for communicating with identity providers using different communications standards.

The access control management system 202 includes functionality for verifying that the user of the second client device 102*b* is identified in the received information associated with the encrypted data object. For example, the access control management system 202 may include functionality for analyzing the received information 208 to determine whether the information 208 includes an identifier of the user. As another example, the access control management system 202 may include functionality for analyzing an access control list included in the received information 208 to determine whether the user is on the access control list.

In some embodiments, the access control management system 202 supports Role-Based Access Control (RBAC). RBAC is an existing access control framework in which access to files is controlled by virtue of the roles a user has been assigned rather than the user's personal identity. In some embodiments, the access control management system 202, the information 208 includes identified properties or roles, and the access control management system 202 makes an access control decision based on whether a user has an authorized property or role.

In some embodiments, the access control management system 202 includes a transaction log in which it stores an identification of at least one of: transactions, users, groups, roles, information 208 associated with each user, policies and business rules. In one of these embodiments, the access control management system 202 issues unique identifiers for data objects, transmitting the unique identifier to the secure object information generator 210 that generates the information 208. By tracking access requests, both valid and invalid, usage statistics can be gathered about who is accessing data and for how long, as well as from where unauthorized access attempts are being made. This capability can enable data owners or stewards to understand what data objects are useful, as well as who they may want to add or remove from their access control lists.

Figure 3A:
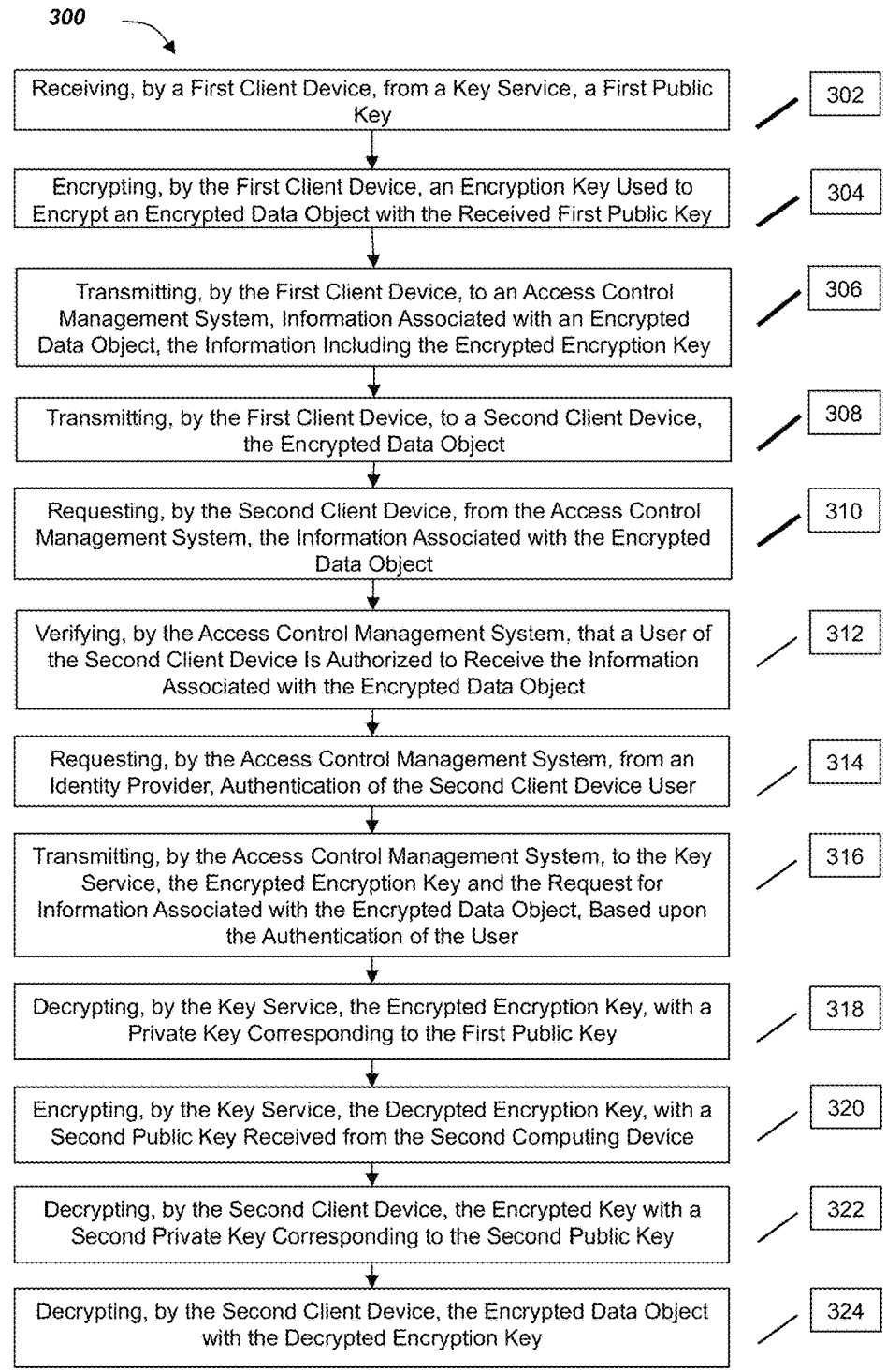
FIG. 3A is a flow diagram depicting an embodiment of a method for distributing cryptographic data.

Referring now to FIG. 3A, a flow diagram depicts one embodiment of a method 300 for distributing encrypted cryptographic data to authenticated recipients. In brief overview, the method 300 includes receiving, by a first client device, from a key service, a first public key (302). The method 300 includes encrypting, by the first client device, an encryption key used to encrypt an encrypted data object with the received first public key (304). The method 300 includes transmitting, by the first client device, to an access control management system, information associated with an encrypted data object, the information including the encrypted encryption key (306). The method 300 includes transmitting, by the first client device, to a second client device, the encrypted data object (308). The method 300 includes requesting, by the second client device, from the access control management system, the information associated with the encrypted data object (310). The method 300 includes verifying by the access control management system, that a user of the second client device is authorized to receive the information associated with the encrypted data object (312). The method 300 includes requesting, by the access control management system, from an identity provider, authentication of the user of the second client device (314). The method 300 includes transmitting, by the access control management system, to the key service, the encrypted encryption key and the request for information associated with the encrypted data object, based upon the authentication of the user (316). The method 300 includes decrypting, by the key service, the encrypted encryption key, with a private key corresponding to the first public key (318). The method 300 includes encrypting, by the key service, the decrypted encryption key, with a second public key received from the second computing device (320). The method 300 includes decrypting, by the second client device, the encrypted key with a second private key corresponding to the second public key (322). The method 300 includes decrypting, by the second client device, the encrypted data object with the decrypted encryption key (324).

Referring now to FIG. 3A in greater detail, and in connection with FIG. 2, the method 300 includes receiving, by a first client device, from a key service, a public key (302). In one embodiment, the first client device 102a requests generation of a new public key (and by extension a corresponding private key) each time a user of the first client device 102a begins a process of transmitting a secured data object to another client device (e.g., the second client device 102b or the third client device 102c). In another embodiment, the first client device 102a requests generation of a new public key (and its corresponding private key) once (e.g., when establishing an account with the customer key service 201 or when instantiating the secure object information generator 210 for the first time) and re-uses the public key for subsequent secure communications. In still another embodiment, the customer key service 201 has the key issuing mechanism 114 generate a single public key (and corresponding private key) which the customer key service 201 distributes to any client device 102 that is associated with the customer key service 201. For example, an organization such as a corporate entity may establish a customer key service 201 for use by each individual associated with the organization (e.g., employees, contractors, owners, etc.).

The customer key service 201 may be referred to as a customer controlled key service since the customer key service 201 may be operated and maintained and/or owned by an entity separate from the access control management system 202; alternatively, however, the same entity that makes the access control management system 202 available also makes a customer key service 201 available (e.g., sells, licenses, or otherwise makes available for instantiation on a customer site). The customer key service 201 and the first client device 102a may be on the same network 104. Although not shown in FIG. 2, one of ordinary skill in the art will understand that the devices shown in FIG. 2 may all be on the same or different networks 104. In some embodiments, for example, the access control management system 202 is on a first network 104a while the customer key service 201 and the first client device 102a are on a second network 104b; the client device 102b may be on a third network 104c and the client device 102c may be on a fourth network 104d.

In one embodiment, the secure object information generator 210 generates the information 208 based upon information provided by the user of the first client device 102a. In another embodiment, the information 208 includes an identifier of the data object 206, cryptographic data associated with the encrypted data object 206 (e.g., a key for decrypting the encrypted data object 206), and an identification of each individual authorized to receive the cryptographic data. In still another embodiment, the information 208 includes an identifier of the data object 206 and cryptographic data associated with the encrypted data object 206 (e.g., a key for decrypting the encrypted data object 206). In such an embodiment, the user of the first client device 102a may provide the identification of each individual authorized to receive the cryptographic data separately from the information 208. In some embodiments, the secure object information generator 210 includes an encryption engine used to generate the cryptographic data. In other embodiments, the secure object information generator 210 executes an encryption engine on the computing device 102a, which generates the cryptographic data.

The method 300 includes encrypting, by the first client device, an encryption key used to encrypt an encrypted data object with the received first public key (304). In some embodiments, the secure object information generator 210 uses the received public key to encrypt an encryption key used to encrypt the data object 206. In other embodiments, the key issue mechanism 214 encrypts the encryption key and provides the encrypted encryption key to the secure object information generator 210.

The method 300 includes transmitting, by the first client device, to an access control management system, information associated with an encrypted data object, the information including the encrypted encryption key (306). In some embodiments, the access control management system 202 receives the information 208 from the first client device 102a via an interface between the secure object information generator 210 executing on the first client device 102a and the secure object information reader 212 executing on the access control management system 202. In one of these embodiments, for example, the secure object information generator 210 executing on the first client device 102a and the secure object information reader 212 use Secure Socket Layers (SSL) or Transport Layer Security (TLS) to communicate. In other embodiments, the access control management system 202 and the first client device 102a establish a secure connection for transmission of the information 208 independently of the secure object information generator 210 and the secure object information reader 212.

The first client device 102a may have selected the access control management system 202 from a plurality of access control management systems 202. In some embodiments, the access control management system 202 receives an indication that the first client device 102a selected the access control management system 202 from a plurality of access control management systems 202a-n for storage of the information 208 associated with the encrypted data object 206. In one of these embodiments, the access control management system 202 receives the indication from the first client device 102a.

In some embodiments, the access control management system 202 authenticates a user of the first client device 102a. For example, the access control management system 202 may authenticate the user of the first client device 102a upon receiving a notification that the first client device 102a selected the access control management system 202 from a plurality of access control management systems 202a-n for storage of the information 208 associated with the encrypted data object 206. In one of these embodiments, the access control management system 202 authenticates the user of the first client device 102a with the identity provider 204. In another of these embodiments, the access control management system 202 identifies a second identity provider 204b to authenticate the user of the first client device 102a. In another of these embodiments, the access control management system 202 uses an interface provided by the secure object information reader 212 to communicate with the secure object information generator 210 executing on the first client device 102a via an interface and authenticates the user of the first client device 102a via the interface. For example, the access control management system 202 may use Secure Socket Layers (SSL) or Transport Layer Security (TLS) to communicate with the first client device 102a.

In one embodiment, the access control management system 202 and the first client device 102a exchange a shared secret key. In another embodiment, the first client device 102a encrypts the information 208 associated with the encrypted data object 206 with the shared secret key. In the embodiment in which the first client device 102a encrypted the encryption key with the public key of the customer key service 201 and also encrypts the information 208 with the shared secret key, this results in a situation in which the underling encryption key is wrapped twice; however, in such an embodiment, the access control management system 202 can only unwrap the layer of encryption provided by the shared secret key—it cannot also unencrypt the encryption performed using the public key of the customer key service 201 since it does not have access to the private key of the customer key service 201.

The first client device 102a transmits the encrypted information 208 to the access control management system 202. In some embodiments, the secure object information generator 210 executing on the first client device 102a includes a public key associated with the access control management system 202 with which the first client device 102a may establish a secure connection to the access control management system 202. In other embodiments, the access control management system 202 establishes a secure communication channel with the first client device 102a through the use of well-established key exchange protocols. As indicated above, in some embodiments, the first client device 102a has encrypted the encryption key with a public key of the customer key service 201; therefore, the encryption key may be encrypted multiple times (e.g., once with a public key of the customer key service 201 and once with a key available to the access control management system 202).

In one embodiment, the access control management system 202 receives information 208 including an access control list associated with the encrypted data object 206. In another embodiment, the access control management system 202 receives information 208 including a cryptographic key for use in decrypting the encrypted data object. In still another embodiment, the access control management system 202 stores the received information 208.

In some embodiments, the access control management system 202 receives information including a user identifier associated with the user of the second client device 102b. In one of these embodiments, the access control management system 202 selects the identity provider 204a with which to authenticate the user of the second client device 102b from a plurality of identity providers 204a-n, based on the received user identifier.

In one embodiment, the access control management system 202 provides an interface with which the user of the first client device 102a can modify the information 208 stored by the access control management system 202. In another embodiment, the user of the first client device 102a generates a modified version of the information 208 and transmits the modified version to the access control management system 202. In some embodiments, the ability to modify an existing enumeration of authorized users within the information 208 allows users to add or revoke access quickly— such as when employees are being hired or fired or consultants are provided with short-term access to secure data.

In one embodiment, the access control management system 202 stores the received information 208 in a database. In some embodiments, the database is an ODBC-compliant database. For example, the database may be provided as an ORACLE database, manufactured by Oracle Corporation of Redwood Shores, Calif. In other embodiments, the database can be a Microsoft ACCESS database or a Microsoft SQL server database, manufactured by Microsoft Corporation of Redmond, Wash. In still other embodiments, the database may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc. of New York, N.Y., and Cassandra databases distributed by The Apache Software Foundation of Forest Hill, Md. In further embodiments, the database may be any form or type of database.

The method 300 includes transmitting, by the first client device, to a second client device, the encrypted data object (308). For example, the secure object information generator 210 may incorporate the encrypted data object 206 into an email message or other electronic communication between the first client device 102a and the second client device 102b, which the first client device 102a may send according to normal electronic messaging protocols. In one embodiment, the first client device 102a transmits the encrypted data object to the second client device 102b. A user of the first client device 102a may send an instruction to the user of the second client device 102b, for example, and without limitation, via electronic communication such as an electronic mail message (e.g., "email") or message sent via a short message service protocol (e.g., "text message"). For example, the user of the first client device 102a may send a message to the user of the second client device 102b including the encrypted data object and an instruction to retrieve cryptographic data for decrypting the document from the access control management system 202 (e.g., by including a uniform resource locator (URL) in the message to provide a link to the access control management system 202). As another example, when the user of the second client device 102b attempts to access the encrypted data object 206, the user is instructed to execute the secure object information reader 212, which may automatically begin the process of establishing authenticating the user to and establishing a secure connection with the access control management system 202.

The method 300 includes requesting, by the second client device, from the access control management system, the information associated with the encrypted data object (310). In one embodiment, the second client device 102b transmits the request to the access control management system 202 after receiving an instruction from the first client device 102a to transmit the request. In some embodiments, the user of the second client device 102b includes an identifier of the identity provider 204 with the request for the information 208.

In some embodiments, the user of the second client device 102b is not required to have an account or a previous relationship of any kind with the access control management system 202; the relationship the user of the second client device 102 has with an identity provider 204 suffices to authenticate the user, as described in further detail below. In one embodiment, where the user of the second client device 102b lacks a relationship with both the access control management system 202 and the identity provider 204, the access control management system 202 transmits to the second client device 102b a message (e.g., an email message) containing a secured link to the access control management system 202 and allows the user of the second client device 102b to establish an account. However, many common providers of consumer email accounts also act as identity providers (e.g., popular providers such as Google, Inc. of Mountain View, Calif., and AOL, Inc. of Dulles, Va., implement the OpenID standard and thus are also identity providers 204).

The method 300 includes verifying, by the access control management system, that a user of the second client device is authorized to receive the information associated with the encrypted data object (312). In one embodiment, the received information 208 includes an access control list identifying users to which the access control management system 202 may forward the information 208.

In some embodiments, the access control management system 202 includes distributed functionality for verifying that the user of the second client device 102b is identified in the received information 208. In one of these embodiments, the functionality provided by the access control management system 202 is distributed across a plurality of machines 106. For example, and without limitation, the access control management system 202 may perform a role-based evaluation of the user of the second client device 102b; for instance, the access control management system 202 may execute a first component for verifying that the user of the second client device 102b is identified in the received information 208 and may execute a second component for verifying that a role associated with the user is a role identified in the information 208. By way of example, the information 208 may specify that cardiologists at a particular hospital may receive a subset of the information 208 (e.g., the cryptographic key) and the user of the second client device 102b may indicate he is a doctor at the particular hospital; the first component may verify that the hospital is listed in the information 208 and the second component may verify that the doctor is a cardiologist at the hospital. In such an embodiment, the first component and the second component may be executed on the same or different machines. For example, the first component may execute on the machine 106a with the access control management system 202 while the second component executes on a machine 106c located at the hospital and in communication with the machine 106a. In another example, the access control management system 202 executing on the machine 106a includes the functionality of both the first component and the second component. In some embodiments, the access control management system 202 includes a policy information point. In other embodiments, the access control management system 202 includes a policy decision point. In further embodiments, the access control management system 202, the first component and the second component may execute functionality for evaluating and enforcing policies.

The method 300 includes requesting, by the access control management system, from an identity provider, authentication of the user of the second client device (314). In some embodiments, the system 200 may include a plurality of identity providers 204 from which the access control management system 202 identifies an identity provider 204 that can authenticate the user of the second client device 102b. In one embodiment, the access control management system 202 determines that the identity provider 204 stores authentication information for the user of the second client device 102b, based on a user identifier. For example, the information 208 may include the user identifier.

In one embodiment, the access control management system 202 sends a request to the identity provider 204 to authenticate the user of the second client device 102b; the identity provider 204 then communicates with the second client device 102b to authenticate the user. For example, the identity provider 204 may request that the user of the second client device 102b transmit a username and password to the identity provider 204 to complete the authentication process. The identity provider 204 may use any method for authenticating the user; by way of example, and without limitation, the identity provider 204 may implement authentication techniques relying on biometrics, hardware tokens, one-time password fobs, and smartphone codes, as well as authentication techniques based on identities of the client devices.

In one embodiment, as discussed above, the access control management system 202 retrieves a user identifier (such as an email address) from the information 208 and identifies the identity provider 204 that can authenticate the user of the second client device 102b based on the user identifier. In one example of such an embodiment, the access control management system 202 uses a domain name within the user identifier (e.g., the portion of an email address located after the @ symbol) to look up the identity provider 204. In another example of such an embodiment, the access control management system 202 accesses a database to look up the identity provider 204 (e.g., a database hosted by the access control management system 202 or by a third party). In such an embodiment, the access control management system 202 receives personally identifiable information (e.g., the email address) of the user of the second client device 102b before authentication of the user. In another embodiment, the user of the second client device 102b provides the access control management system 202 with an identifier of the identity provider 204; for example, the identifier may be a uniform resource locator (URL) that directs the access control management system 202 to the identity provider 204 for initiating the authentication process. In one example of such an embodiment, the access control management system 202 does not receive personally identifiable information of the user of the second client device 102b (e.g., an email address) until after the authentication process is complete. In another embodiment, the user of the second client device 102b provides the access control management system 202 with a URL (e.g., a fully qualified OpenID URL) that directs the access control management system 202 to a resource hosted by the identity provider 204 that can be used by the access control management system 202 to initiate the authentication process. In one example of such an embodiment, discovery of the identity provider 204 is not required since the identity provider 204 is explicitly identified in the URL. In another example of such an embodiment, the user of the second client device 102b provides personally identifiable information to the access control management system 202 (e.g., the URL or a portion thereof).

In some embodiments, if an individual other than the intended user accesses the user's client device 102, opens the secure object information generator 210 or the secure object information reader 212 and tries to open a data object 206, that individual will need to know the user's identifying information as maintained by the identity provider 204 (e.g., the user's email password), or fulfill other authentication criteria, in order to receive authentication. In this manner, protection is provided against hackers or thieves gaining access to protected files.

In some embodiments, incorporating the methods and systems described herein adds an additional layer of protection by separating the locations at which the following reside: (1) the encrypted data object 206, (2) the information 208, and (3) the authentication information with which the user of the second client device 102b authenticates himself to the identity provider 204; for example, neither the encrypted data object 206 nor the authentication information reside on the access control management system 202.

In one embodiment, the access control management system 202 sends, to the second client device, the received information associated with the encrypted data object. In one embodiment, the access control management system 202 establishes a secure connection to the second client device 102b upon authentication of the user of the second client device 102b. In some embodiments, the secure object information reader 212 executing on the second client device 102b includes a public key associated with the access control management system 202 with which the second client device 102b may establish a secure connection to the access control management system 202. In other embodiments, the access control management system 202 establishes a secure communication channel with the second client device 102b through the use of well-established key exchange protocols. In further embodiments, the second client device 102b sends an identification of the encrypted data object 206 to the access control management system 202 with the request for the information 208 over the established communications channel.

In some embodiments, the access control management system 202 sends all of the received information 208 to the second client device 102b. In other embodiments, the access control management system 202 sends a subset of the received information 208 to the second client device 102b. For example, where the received information 208 includes an access control list and a cryptographic key, the access control management system 202 may send just the cryptographic key to the second client device 102b, or the access control management system 202 may send both the access control list and the cryptographic key.

However, in embodiments in which the first client device 102a encrypted the encryption key with the public key received from the customer key service 201, the second client device 102b does not yet have access to the encryption key when the access control management system 202 provides it with the information 208 because neither the access control management system 202 nor the second client device 102b have the private key that corresponds to the public key of the customer key service 201, which was used to encrypt the encryption key. Therefore, the access control management system 202 includes functionality for communicating with the customer key service 201 in order to enable the second client device 102b decrypt the encryption key.

The method 300 includes transmitting, by the access control management system, to the key service, the encrypted encryption key and the request for information associated with the encrypted data object, based upon the authentication of the user (316). The access control management 202 may provide to the customer key service 201 a notification indicating that someone has requested access to the encrypted data object (and as a result to the encrypted encryption key) and that the access control management system 202 has already had the identity provider 204 authenticate the user of the requesting client device 102. In some embodiments, this functionality allows the customer key service 201 (which has the private key that corresponds to the public key) to be notified of the request and assist in the decryption process without the client device 102b (the recipient of the encrypted data object 206) having to know how to reach the customer key service 201 (and by extension all customer key services associated with any individuals from which she may wish to receive encrypted data objects) and then actually establish communications with the customer key service 201—and without the access control management system 202 having to have access to the private key that would allow it to unencrypt the encryption key, resulting in a more secure implementation.

The method 300 includes decrypting, by the key service, the encrypted encryption key, with a private key corresponding to the first public key (318). Since the customer key service 201 had its key issue mechanism 214 generate the public key and the private key, the customer key service 201 already has access to the private key 216.

The method 300 includes encrypting, by the key service, the decrypted encryption key, with a second public key received from the second computing device (320). In one embodiment, the customer key service 201 uses a public key of a user of a second client device 102b (e.g., an intended recipient of the information 208) to encrypt the encryption key. The public key may have been generated specifically for the purposes of having the customer key service 201 encrypt that particular encryption key (e.g., is specific to that session) or may be a reusable public-private key pair. In such an embodiment, the user of the second client device 102b has made the public key available to the customer key service 201 directly or indirectly (e.g., via transmission to the user of the first client device 102a for forwarding to the customer key service 201, by publishing the public key (e.g., in any manner understood by those of ordinary skill in the art), sharing the public key in advance of an attempt by the user of the first client device 102a to share an encrypted data object with the user of the second client device 102b, by having a public key (such as a Pretty Good Privacy key) and a password-protected private key synced to the access control management system 202 (without the password), through the use of a hardware device that stores a private key (e.g., pin on a card), or in any other manner or at any other time as will be understood by one of ordinary skill in the art). In these embodiments, the users of the first and second client devices exchange encryption keys using the access control management system 202 as an intermediary that stores the encryption keys, while keeping the access control management system 202 from using the encryption keys (since the encryption keys are encrypted and the access control management system 202 would need access to a private key of either of the users in order to decrypt the encryption keys). The customer key service 201 may then transmit the encryption key, encrypted with the public key of the second computing device 102b, to the access control management system 202 for forwarding to the second computing device 102b (for example, with the information 208 associated with the encrypted data object 206). The customer key service 201 may alternatively transmit the encryption key encrypted with the public key of the second computing device 102b directly to the second computing device 102b.

The method 300 includes decrypting, by the second client device, the encrypted key with a second private key corresponding to the second public key (322). Since the second client device 102b is the only device that has access to the second private key, the second computing device 102b can be assured that the access control management system 202 did not access the encryption key (or, by extension, the encrypted data object 206).

The method 300 includes decrypting, by the second client device, the encrypted data object with the decrypted encryption key (324). In some embodiments, the cryptographic key is not accessed by the user of the second client device 102b but delivered to trusted services and applications in memory 122. In one of these embodiments, the cryptographic key is not stored in storage 128 of the second client device 102b, to prevent the user of the second client device 102b from accessing the cryptographic key directly. In other embodiments, cryptographic keys are delivered in a persistent ticket (much like a web cookie). In this way, users have the ability to decrypt an encrypted data object 206 for viewing even if there is no network access to the access control management system 202. In one of these embodiments, a locally available authentication mechanism is used that can also protect the ticket residing in storage 128; such a mechanism might be provided by a secure PKI hardware token that the user uses to authenticate directly to the client device 102, or at least to unlock the ticket.

In some embodiments, the access control management system 202 uses the same identity provider 204 for authenticating each user who requests access to the information 208. In other embodiments, the access control management system 202 uses different identity providers 204 to authenticate different users. In one of these embodiments, the access control management system 202 selects a first identity provider 204a to authenticate a user of the second client device 102b. In another of these embodiments, the access control management system 202 receives, from a third client device 102c, a request for the information 208 associated with the encrypted data object 206. In still another of these embodiments, the access control management system 202 verifies that a user of the third client device 102c is identified in the received information associated with the encrypted data object. In another of these embodiments, the access control management system 202 authenticates the user of the third client device 102c with a second identity provider 204b. In yet another of these embodiments, the access control management system 202 sends the received information 208 associated with the encrypted data object 206 to the authenticated user of the third client device 102c.

In some embodiments, the system 200 may include a plurality of access control management systems 202a-n. In some embodiments, the user of the first client device 102a selects different access control management systems 202 for different recipients of the encrypted data object 206. In one of these embodiments, a second access control management system 202b receives, from the first client device 102a, information 208 associated with the encrypted data object 206. In another of these embodiments, the second access control management system 202b receives, from a third client device 102c, a request for the information 208 associated with the encrypted data object 206. In still another of these embodiments, the second access control management system 202b verifies that a user of the third client device 102c is identified in the received information 208 associated with the encrypted data object 206; for example, the second access control management system 202b may verify that the user of the third client device 102 is identified in the received information 208 as described above. In another of these embodiments, the second access control management system 202b authenticates the user of the third client device 102c; for example, the second access control management system 202b may authenticate the user of the third client device 102 as described above. In one embodiment, the second access control management system 202b authenticates the user of the third client device 102c with the identity provider 204. In another embodiment, the second access control management system 202b authenticates the user of the third client device 102c with a second identity provider 204b. In yet another of these embodiments, the second access control management system 202b sends, to the third client device 102c, the received information 208 associated with the encrypted data object 206; for example, the second access control management system 202b may authenticate the user of the third client device 102 as described above. In other embodiments, however, it will be understood, a single access control management system may receive requests from multiple users for access to the information. In further embodiments, it will be understood that either a single access control management system or a plurality of access control management systems may receive and process requests for access to one or more sets of information associated with one or more data objects.

Figure 3B:
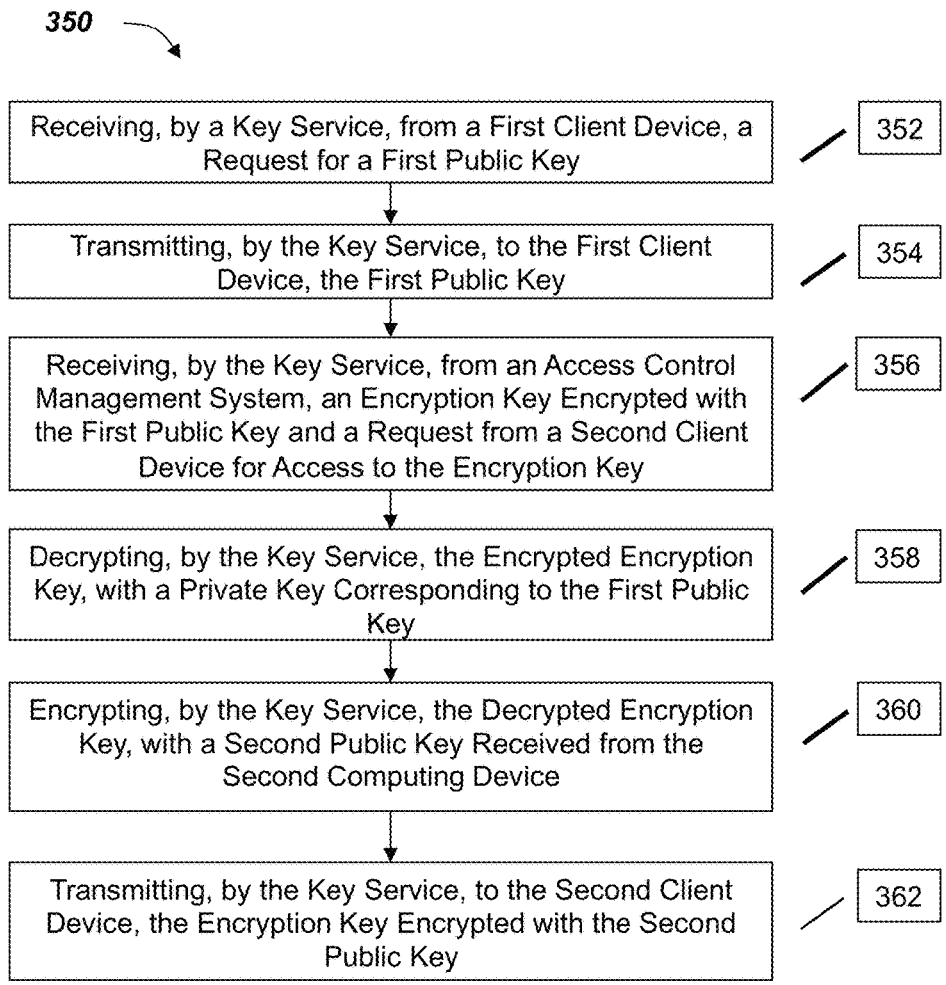
FIG. 3B is a flow diagram depicting an embodiment of a method for distributing cryptographic data.

Referring now to FIG. 3B, a method 350 for key encryption and distribution includes receiving, by a key service, from a client device, a request for a first public key (352). The method 350 includes transmitting, by the key service, to the first client device, the first public key (354). The method 350 includes receiving, by the key service, from an access control management system, an encryption key encrypted with the first public key and a request from a second client device for access to the encryption key (356). The method 350 includes decrypting, by the key service, the encrypted encryption key, with a private key corresponding to the first public key (358). The method 350 includes encrypting, by the key service, the decrypted encryption key, with a second public key received from the second computing device (360). The method 350 includes transmitting, by the key service, to the second client device, the encryption key encrypted with the second public key (362). In some embodiments, the method 350 enables a key service to provide functionality for distribution of encrypted encryption keys, which allows a sender and a receiver of encrypted data objects to leverage an access control management system without requiring either the sender or the receiver to trust the access control management system with (unprotected) encrypted keys, while also allowing a recipient of encrypted data objects to leverage the access control management system and the other features and functionality described herein without having to have a direct relationship with either a key service or an access control management system.

The method 350 includes receiving, by a key service, from a client device, a request for a public key (352). The customer key service 201 may receive the request for the public key as described above in connection with FIG. 3A (302).

The method 350 includes transmitting, by the key service, to the first client device, the public key (354). The customer key service 201 may transmit the public key as described above in connection with FIG. 3A (302).

The method 350 includes receiving, by the key service, from an access control management system, an encryption key encrypted with the first public key and a request from a second client device for access to the encryption key (356). The customer key service 201 may receive the encrypted encryption key and the request as described above in connection with FIG. 3A (316).

The method 350 includes decrypting, by the key service, the encrypted encryption key, with a private key corresponding to the first public key (358). The customer key service 201 may decrypt the encrypted encryption key as described above in connection with FIG. 3A (318).

The method 350 includes encrypting, by the key service, the decrypted encryption key, with a second public key received from the second computing device (360). The customer key service 201 may encrypt the decrypted encryption key as described above in connection with FIG. 3A (320).

The method 350 includes transmitting, by the key service, to the second client device, the encryption key encrypted with the second public key (362). In one embodiment, the access control management system 202 provides the key service 201 with information for transmitting data to the second client device 102b (e.g., with an email address or other identifier, for example, as provided within the information 208). In another embodiment, the customer key service 201 transmits the encrypted encryption key to the access control management system 202 for forwarding to the second client device 102b.

In some embodiments of the methods and systems described above, the system 200 may include a hardware security module (HSM). For example, the customer key service 201 may implement a hardware security module that provides the functionality described above in connection with the customer key service 201.

Some of the embodiments described above address scenarios in which recipient users (e.g., of client devices 102b or 102c) have made public keys available to sending users (e.g., the user of the first client device 102a) and were included by the sending users in a recipient list provided to the access control management system 202. However, in some embodiments, either a user has not made a public key available (e.g., because she does not yet have a public key or did not know that the sender needed it) or the user was not an intended recipient of the encrypted data object (e.g., an intended recipient forwarded the encrypted data object to another recipient without first coordinating the forwarding with the original sender). The systems and methods described herein also provide functionality for addressing these scenarios.

Figure 4:
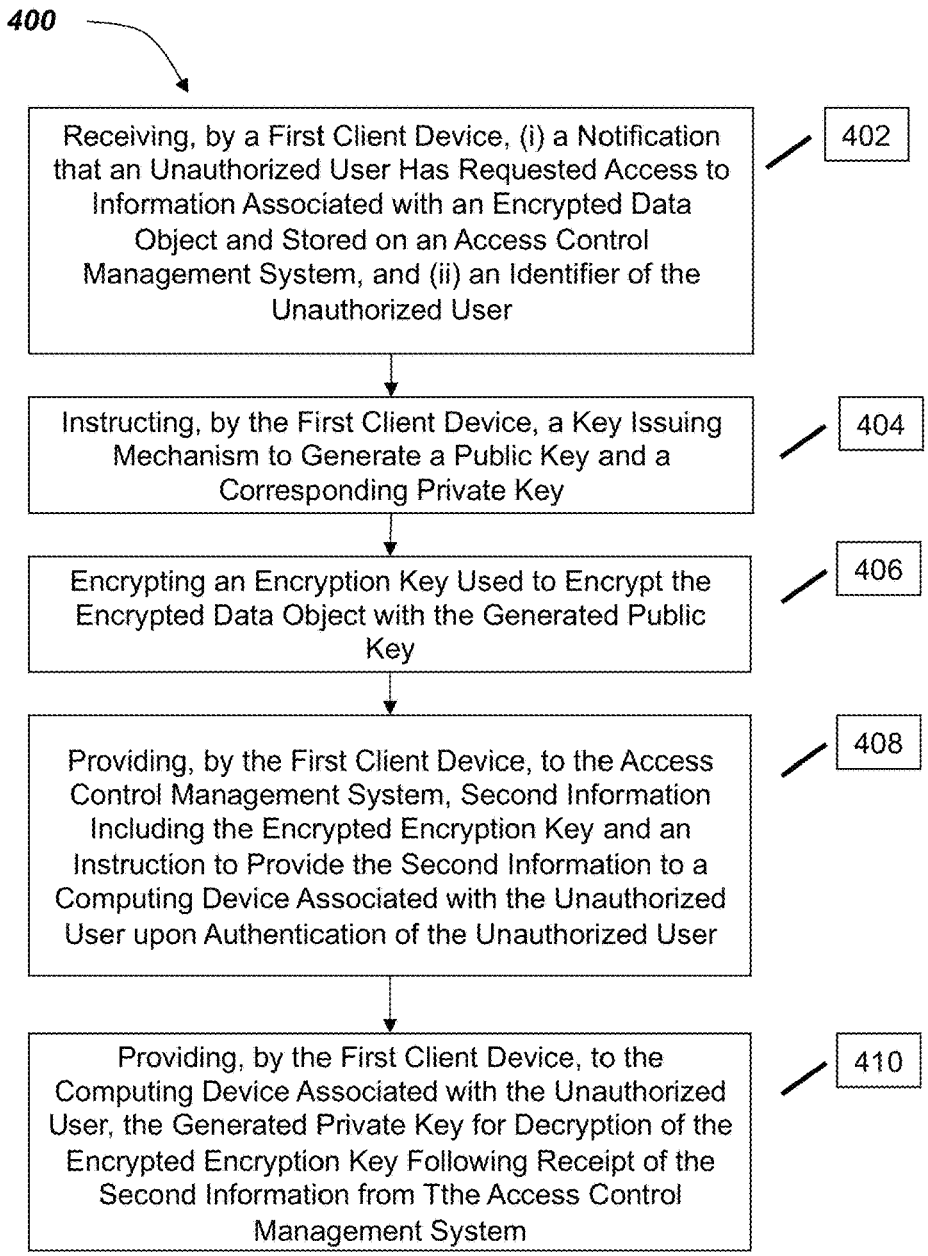
FIG. 4 is a flow diagram depicting an embodiment of a method for distributing cryptographic data.

Referring now to FIG. 4, a flow diagram depicts one embodiment of a method 400 for distributing encrypted cryptographic data to authenticated recipients. In brief overview, the method 400 includes receiving, by a first client device, (i) a notification that an unauthorized user has requested access to information associated with an encrypted data object and stored on an access control management system, and (ii) an identifier of the unauthorized user (402). The method 400 includes instructing, by the first client device, a key issuing mechanism to generate a public key and a corresponding private key (404). The method 400 includes encrypting an encryption key used to encrypt the encrypted data object with the generated public key (406). The method 400 includes providing, by the first client device, to the access control management system, second information including the encrypted encryption key and an instruction to provide the second information to a computing device associated with the unauthorized user upon authentication of the unauthorized user (408). The method 400 includes providing, by the first client device, to the computing device associated with the unauthorized user, the generated private key for decryption of the encrypted encryption key following receipt of the second information from the access control management system (410).

Referring now to FIG. 4 in greater detail, and in connection with FIGS. 2 and 3A-B, the method 400 includes receiving, by a first client device, (i) a notification that an unauthorized user has requested access to information associated with an encrypted data object and stored on an access control management system, and (ii) an identifier of the unauthorized user (402). In one embodiment, before receiving the notification and the identifier, a user of the first client device 102a has previously executed the secure object information generator 210 to encrypt the data object 206, generate the information 208, and send the information 208 to the access control management system 202.

In one embodiment, the secure object information generator 210 generates the information 208 based upon information provided by the user of the first client device 102a. In another embodiment, the information 208 includes an identifier of the data object 206, cryptographic data associated with the encrypted data object 206 (e.g., a key for decrypting the encrypted data object 206), and an identification of each individual authorized to receive the cryptographic data. In still another embodiment, the information 208 includes an identifier of the data object 206 and cryptographic data associated with the encrypted data object 206 (e.g., a key for decrypting the encrypted data object 206). In such an embodiment, the user of the first client device 102a may provide the identification of each individual authorized to receive the cryptographic data separately from the information 208. In some embodiments, the secure object information generator 210 includes an encryption engine used to generate the cryptographic data. In other embodiments, the secure object information generator 210 executes an encryption engine on the computing device 102a, which generates the cryptographic data.

In some embodiments, the secure object information generator 210 encrypts an encryption key used to encrypt the data object 206. In one embodiment, the secure object information generator 210 uses a public key of the user of the first client device 102a to encrypt the encryption key. In another embodiment, the secure generator 210 uses a public key of a user of a second client device 102b (e.g., an intended recipient of the information 208) to encrypt the encryption key. In such an embodiment, the user of the second client device 102b has made the public key available to the user of the first client device 102a (e.g., by publishing the public key, sharing the public key in advance of an attempt by the user of the first client device 102a to share an encrypted data object with the user of the second client device 102b, or in any other manner or at any other time as will be understood by one of ordinary skill in the art). In these embodiments, the users of the first and second client devices 102 exchange encryption keys using the access control management system 202 as an intermediary that stores the encryption keys, while keeping the access control management system 202 from using the encryption keys (since the encryption keys are encrypted and the access control management system 202 would need access to a private key of either of the users in order to decrypt the encryption keys).

In some embodiments, the access control management system 202 receives the information 208 from the first client device 102a via an interface between the secure object information generator 210 executing on the first client device 102a and the secure object information reader 212 executing on the access control management system 202. In one of these embodiments, for example, the secure object information generator 210 executing on the first client device 102a and the secure object information reader 212 use Secure Socket Layers (SSL) or Transport Layer Security (TLS) to communicate. In other embodiments, the access control management system 202 and the first client device 102a establish a secure connection for transmission of the information 208 independently of the secure object information generator 210 and the secure object information reader 212.

In some embodiments, the access control management system 202 receives an indication that the first client device 102a selected the access control management system 202 from a plurality of access control management systems 202a-n for storage of the information 208 associated with the encrypted data object 206. In one of these embodiments, the access control management system 202 receives the indication from the first client device 102a.

In some embodiments, the access control management system 202 authenticates a user of the first client device 102a. For example, the access control management system 202 may authenticate the user of the first client device 102a upon receiving a notification that the first client device 102a selected the access control management system 202 from a plurality of access control management systems 202a-n for storage of the information 208 associated with the encrypted data object 206. In one of these embodiments, the access control management system 202 authenticates the user of the first client device 102a with the identity provider 204. In another of these embodiments, the access control management system 202 identifies a second identity provider 204b to authenticate the user of the first client device 102a. In another of these embodiments, the access control management system 202 uses an interface provided by the secure object information reader 212 to communicate with the secure object information generator 210 executing on the first client device 102a via an interface and authenticates the user of the first client device 102a via the interface. For example, the access control management system 202 may use Secure Socket Layers (SSL) or Transport Layer Security (TLS) to communicate with the first client device 102a.

In one embodiment, the access control management system 202 and the first client device 102a exchange a shared secret key. In another embodiment, the first client device 102a encrypts the information 208 associated with the encrypted data object 206 with the shared secret key. In still another embodiment, the first client device 102a transmits the encrypted information 208 to the access control management system 202. In some embodiments, the secure object information generator 210 executing on the first client device 102a includes a public key associated with the access control management system 202 with which the first client device 102a may establish a secure connection to the access control management system 202. In other embodiments, the access control management system 202 establishes a secure communication channel with the first client device 102a through the use of well-established key exchange protocols. As indicated above, in some embodiments, the first client device 102a has encrypted the encryption key with a public key of a user of either the first client device 102a or the second client device 102b; therefore, the encryption key may be encrypted multiple times (e.g., once with either a sender or recipient public key and once with a key available to the access control management system 202).

In one embodiment, the access control management system 202 receives information 208 including an access control list associated with the encrypted data object 206. In another embodiment, the access control management system 202 receives information 208 including a cryptographic key for use in decrypting the encrypted data object. In still another embodiment, the access control management system 202 stores the received information 208.

In some embodiments, the access control management system 202 receives information including a user identifier associated with the user of the second client device 102b. In one of these embodiments, the access control management system 202 selects the identity provider 204a with which to authenticate the user of the second client device 102b from a plurality of identity providers 204a-n, based on the received user identifier.

In one embodiment, the access control management system 202 provides an interface with which the user of the first client device 102a can modify the information 208 stored by the access control management system 202. In another embodiment, the user of the first client device 102a generates a modified version of the information 208 and transmits the modified version to the access control management system 202. In some embodiments, the ability to modify an existing enumeration of authorized users within the information 208 allows users to add or revoke access quickly—such as when employees are being hired or fired or consultants are provided with short-term access to secure data.

In one embodiment, the access control management system 202 stores the received information 208 in a database. In some embodiments, the database is an ODBC-compliant database. For example, the database may be provided as an ORACLE database, manufactured by Oracle Corporation of Redwood Shores, Calif. In other embodiments, the database can be a Microsoft ACCESS database or a Microsoft SQL server database, manufactured by Microsoft Corporation of Redmond, Wash. In still other embodiments, the database may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc. of New York, N.Y., and Cassandra databases distributed by The Apache Software Foundation of Forest Hill, Md. In further embodiments, the database may be any form or type of database.

In some embodiments, the access control management system receives, from a second client device, a request for the information associated with the encrypted data object. In one embodiment, the second client device 102b transmits the request to the access control management system 202 after receiving an instruction from the first client device 102a to transmit the request. In one embodiment, the first client device 102a transmits the encrypted data object to the second client device 102b. A user of the first client device 102a may send an instruction to the user of the second client device 102b, for example, and without limitation, via electronic communication such as an electronic mail message (e.g., "email") or message sent via a short message service protocol (e.g., "text message"). For example, the user of the first client device 102a may send a message to the user of the second client device 102b including the encrypted data object and an instruction to retrieve cryptographic data for decrypting the document from the access control management system 202 (e.g., by including a uniform resource locator (URL) in the message to provide a link to the access control management system 202). As another example, when the user of the second client device 102b attempts to access the encrypted data object 206, the user is instructed to execute the secure object information reader 212, which may automatically begin the process of authenticating the user to and establishing a secure connection with the access control management system 202. In some embodiments, the user of the second client device 102b includes an identifier of the identity provider 204 with the request for the information 208.

In some embodiments, the user of the second client device 102b is not required to have an account or a previous relationship of any kind with the access control management system 202; the relationship the user of the second client device 102 has with an identity provider 204 suffices to authenticate the user, as described in further detail below. In one embodiment, where the user of the second client device 102b lacks a relationship with both the access control management system 202 and the identity provider 204, the access control management system 202 transmits to the second client device 102b a message (e.g., an email message) containing a secured link to the access control management system 202 and allows the user of the second client device 102b to establish an account. However, many common providers of consumer email accounts also act as identity providers (e.g., popular providers such as Google, Inc. of Mountain View, Calif., and AOL, Inc. of Dulles, Va. implement the OpenID standard and thus are also identity providers 204).

In one embodiment, the access control management system verifies that a user of the second client device 102b is identified in the received information associated with the encrypted data object. In one embodiment, the received information 208 includes an access control list identifying users to which the access control management system 202 may forward the information 208.

In some embodiments, the access control management system 202 includes distributed functionality for verifying that the user of the second client device 102b is identified in the received information 208. In one of these embodiments, the functionality provided by the access control management system 202 is distributed across a plurality of machines 106. For example, and without limitation, the access control management system 202 may perform a role-based evaluation of the user of the second client device 102b; for instance, the access control management system 202 may execute a first component for verifying that the user of the second client device 102b is identified in the received information 208 and may execute a second component for verifying that a role associated with the user is a role identified in the information 208. By way of example, the information 208 may specify that cardiologists at a particular hospital may receive a subset of the information 208 (e.g., the cryptographic key) and the user of the second client device 102b may indicate he is a doctor at the particular hospital; the first component may verify that the hospital is listed in the information 208 and the second component may verify that the doctor is a cardiologist at the hospital. In such an embodiment, the first component and the second component may be executed on the same or different machines. For example, the first component may execute on the machine 106a with the access control management system 202 while the second component executes on a machine 106c located at the hospital and in communication with the machine 106a. In another example, the access control management system 202 executing on the machine 106a includes the functionality of both the first component and the second component. In some embodiments, the access control management system 202 includes a policy information point. In other embodiments, the access control management system 202 includes a policy decision point. In further embodiments, the access control management system 202, the first component and the second component may execute functionality for evaluating and enforcing policies.

In some embodiments, the access control management system 202 authenticates, with an identity provider 204, the user of the second client device 102b. In some embodiments, the system 200 may include a plurality of identity providers 204 from which the access control management system 202 identifies an identity provider 204 that can authenticate the user of the second client device 102b. In one embodiment, the access control management system 202 determines that the identity provider 204 stores authentication information for the user of the second client device 102b, based on a user identifier. For example, the information 208 may include the user identifier.

In one embodiment, the access control management system 202 sends a request to the identity provider 204 to authenticate the user of the second client device 102b; the identity provider 204 then communicates with the second client device 102*b* to authenticate the user. For example, the identity provider 204 may request that the user of the second client device 102*b* transmit a username and password to the identity provider 204 to complete the authentication process. The identity provider 204 may use any method for authenticating the user; by way of example, and without limitation, the identity provider 204 may implement authentication techniques relying on biometrics, hardware tokens, one-time password fobs, and smartphone codes, as well as authentication techniques based on identities of the client devices.

In one embodiment, as discussed above, the access control management system 202 retrieves a user identifier (such as an email address) from the information 208 and identifies the identity provider 204 that can authenticate the user of the second client device 102*b* based on the user identifier. In one example of such an embodiment, the access control management system 202 uses a domain name within the user identifier (e.g., the portion of an email address located after the @ symbol) to look up the identity provider 204. In another example of such an embodiment, the access control management system 202 accesses a database to look up the identity provider 204 (e.g., a database hosted by the access control management system 202 or by a third party). In such an embodiment, the access control management system 202 receives personally identifiable information (e.g., the email address) of the user of the second client device 102*b* before authentication of the user. In another embodiment, the user of the second client device 102*b* provides the access control management system 202 with an identifier of the identity provider 204; for example, the identifier may be a uniform resource locator (URL) that directs the access control management system 202 to the identity provider 204 for initiating the authentication process. In one example of such an embodiment, the access control management system 202 does not receive personally identifiable information of the user of the second client device 102*b* (e.g., an email address) until after the authentication process is complete. In another embodiment, the user of the second client device 102*b* provides the access control management system 202 with a URL (e.g., a fully qualified OpenID URL) that directs the access control management system 202 to a resource hosted by the identity provider 204 that can be used by the access control management system 202 to initiate the authentication process. In one example of such an embodiment, discovery of the identity provider 204 is not required since the identity provider 204 is explicitly identified in the URL. In another example of such an embodiment, the user of the second client device 102*b* provides personally identifiable information to the access control management system 202 (e.g., the URL or a portion thereof).

In some embodiments, if an individual other than the intended user accesses the user's client device 102, opens the secure object information generator 210 or the secure object information reader 212 and tries to open a data object 206, that individual will need to know the user's identifying information as maintained by the identity provider 204 (e.g., the user's email password), or fulfill other authentication criteria, in order to receive authentication. In this manner, protection is provided against hackers or thieves gaining access to protected files.

In some embodiments, incorporating the methods and systems described herein adds an additional layer of protection by separating the locations at which the following reside: (1) the encrypted data object 206, (2) the information 208, and (3) the authentication information with which the user of the second client device 102*b* authenticates himself to the identity provider 204; for example, neither the encrypted data object 206 nor the authentication information reside on the access control management system 202.

In one embodiment, the access control management system 202 sends, to the second client device 102*b*, the received information 208 associated with the encrypted data object 206. In one embodiment, the access control management system 202 establishes a secure connection to the second client device 102*b* upon authentication of the user of the second client device 102*b*. In some embodiments, the secure object information reader 212 executing on the second client device 102*b* includes a public key associated with the access control management system 202 with which the second client device 102*b* may establish a secure connection to the access control management system 202. In other embodiments, the access control management system 202 establishes a secure communication channel with the second client device 102*b* through the use of well-established key exchange protocols. In further embodiments, the second client device 102*b* sends an identification of the encrypted data object 206 to the access control management system 202 with the request for the information 208 over the established communications channel.

In some embodiments, the access control management system 202 sends all of the received information 208 to the second client device 102*b*. In other embodiments, the access control management system 202 sends a subset of the received information 208 to the second client device 102*b*. For example, where the received information 208 includes an access control list and a cryptographic key, the access control management system 202 may send just the cryptographic key to the second client device 102*b*, or the access control management system 202 may send both the access control list and the cryptographic key. In one embodiment, the second client device 102*b* decrypts the encrypted data object 206 with a cryptographic key included in the received information 208 associated with the encrypted data object 206. In some embodiments, the cryptographic key is not accessed by the user of the second client device 102*b* but delivered to trusted services and applications in memory 122. In one of these embodiments, the cryptographic key is not stored in storage 128 of the second client device 102*b*, to prevent the user of the second client device 102*b* from accessing the cryptographic key directly. In other embodiments, cryptographic keys are delivered in a persistent ticket (much like a web cookie). In this way, users have the ability to decrypt an encrypted data object 206 for viewing even if there is no network access to the access control management system 202. In one of these embodiments, a locally available authentication mechanism is used that can also protect the ticket residing in storage 128; such a mechanism might be provided by a secure PKI hardware token that the user uses to authenticate directly to the client device 102, or at least to unlock the ticket.

In some embodiments, the access control management system 202 uses the same identity provider 204 for authenticating each user who requests access to the information 208. In other embodiments, the access control management system 202 uses different identity providers 204 to authenticate different users. In one of these embodiments, the access control management system 202 selects a first identity provider 204*a* to authenticate a user of the second client device 102*b*. In another of these embodiments, the access control management system 202 receives, from a third client device 102*c*, a request for the information 208 associated with the encrypted data object 206. In still another of these embodiments, the access control management system 202 verifies that a user of the third client device 102*c* is identified in the received information associated with the encrypted data object. In another of these embodiments, the access control management system 202 authenticates the user of the third client device 102c with a second identity provider 204b. In yet another of these embodiments, the access control management system 202 sends the received information 208 associated with the encrypted data object 206 to the authenticated user of the third client device 102c.

In some embodiments, the system 200 may include a plurality of access control management systems 202a-n. In some embodiments, the user of the first client device 102a selects different access control management systems 202 for different recipients of the encrypted data object 206. In one of these embodiments, a second access control management system 202b receives, from the first client device 102a, information 208 associated with the encrypted data object 206. In another of these embodiments, the second access control management system 202b receives, from a third client device 102c, a request for the information 208 associated with the encrypted data object 206. In still another of these embodiments, the second access control management system 202b verifies that a user of the third client device 102c is identified in the received information 208 associated with the encrypted data object 206; for example, the second access control management system 202b may verify that the user of the third client device 102 is identified in the received information 208 as described above. In another of these embodiments, the second access control management system 202b authenticates the user of the third client device 102c; for example, the second access control management system 202b may authenticate the user of the third client device 102 as described above. In one embodiment, the second access control management system 202b authenticates the user of the third client device 102c with the identity provider 204. In another embodiment, the second access control management system 202b authenticates the user of the third client device 102c with a second identity provider 204b. In yet another of these embodiments, the second access control management system 202b sends, to the third client device 102c, the received information 208 associated with the encrypted data object 206; for example, the second access control management system 202b may authenticate the user of the third client device 102 as described above. In other embodiments, however, it will be understood, a single access control management system may receive requests from multiple users for access to the information. In further embodiments, it will be understood that either a single access control management system or a plurality of access control management systems may receive and process requests for access to one or more sets of information associated with one or more data objects.

Some of the embodiments described above address scenarios in which recipient users (e.g., of client devices 102b or 102c) have made public keys available to sending users (e.g., the user of the first client device 102a) and were included by the sending users in a recipient list provided to the access control management system 202. However, in some embodiments, either a user has not made a public key available (e.g., because she does not yet have a public key or did not know that the sender needed it) or the user was not an intended recipient of the encrypted data object (e.g., an intended recipient forwarded the encrypted data object to another recipient without first coordinating the forwarding with the original sender). The systems and methods described herein also provide functionality for addressing these scenarios.

Referring back to FIG. 4 (402), a user of a client device (e.g., the client device 102c) may have requested access to the information from the access control management system 202. The access control management system 202 may transmit the notification to the first client device 102a.

The method 400 includes instructing, by the first client device, a key issuing mechanism to generate a public key and a corresponding private key (404). In one embodiment, the first client device 102a includes the key issue mechanism 214 (e.g., in the secure object information generator 210). In another embodiment, a machine 106c includes the key issue mechanism 214. For example, the client device 102a and the machine 106c may be connected to an enterprise intranet 104a, which allows communication with the access control management system 202 across an internet 104b; the machine 106c may provide a plurality of client devices 102 with access to the functionality of the key issue mechanism 214. The client device 102 transmits an instruction to the key issue mechanism 214 to generate the public key and the corresponding private key (which may also be referred to as a public-private key pair).

In one embodiment, the key issue mechanism 214 uses the identifier of the unauthorized user in generating the public-private key pair. In another embodiment, the key issue mechanism 214 uses a separate private key 216 of the user of the first client device 102a in generating the public-private key pair.

The method 400 includes encrypting an encryption key used to encrypt the encrypted data object with the generated public key (406). In one embodiment, the first client device 102a encrypts the encryption key with the generated public key. In another embodiment, the key issue mechanism 214 encrypts the encryption key. In still another embodiment, the secure object information generator 210 encrypts the encryption key.

The method 400 includes providing, by the first client device, to the access control management system, second information including the encrypted encryption key and an instruction to provide the second information to a computing device associated with the unauthorized user upon authentication of the unauthorized user (408). In one embodiment, the first client device 102a transmits the second information to the access control management system 202 as described above in connection with transmission of the information 208.

The method 400 includes providing, by the first client device, to the computing device associated with the unauthorized user, the generated private key for decryption of the encrypted encryption key following receipt of the second information from the access control management system (410). In one embodiment, the access control management system 202 authenticates the (previously) unauthorized user of the client device 102c with an identity provider 204 as discussed above in connection with authentication of the user of the client device 102b. The user of the client device 102c may receive the generated private key pair from the first client device 102a and the second information from the access control management system 202. The user of the client device 102c may use the received private key pair to unencrypt the encrypted key received within the second information. The user of the client device 102c may use the unencrypted encryption key to unencrypt the encrypted data object.

Figure 5:
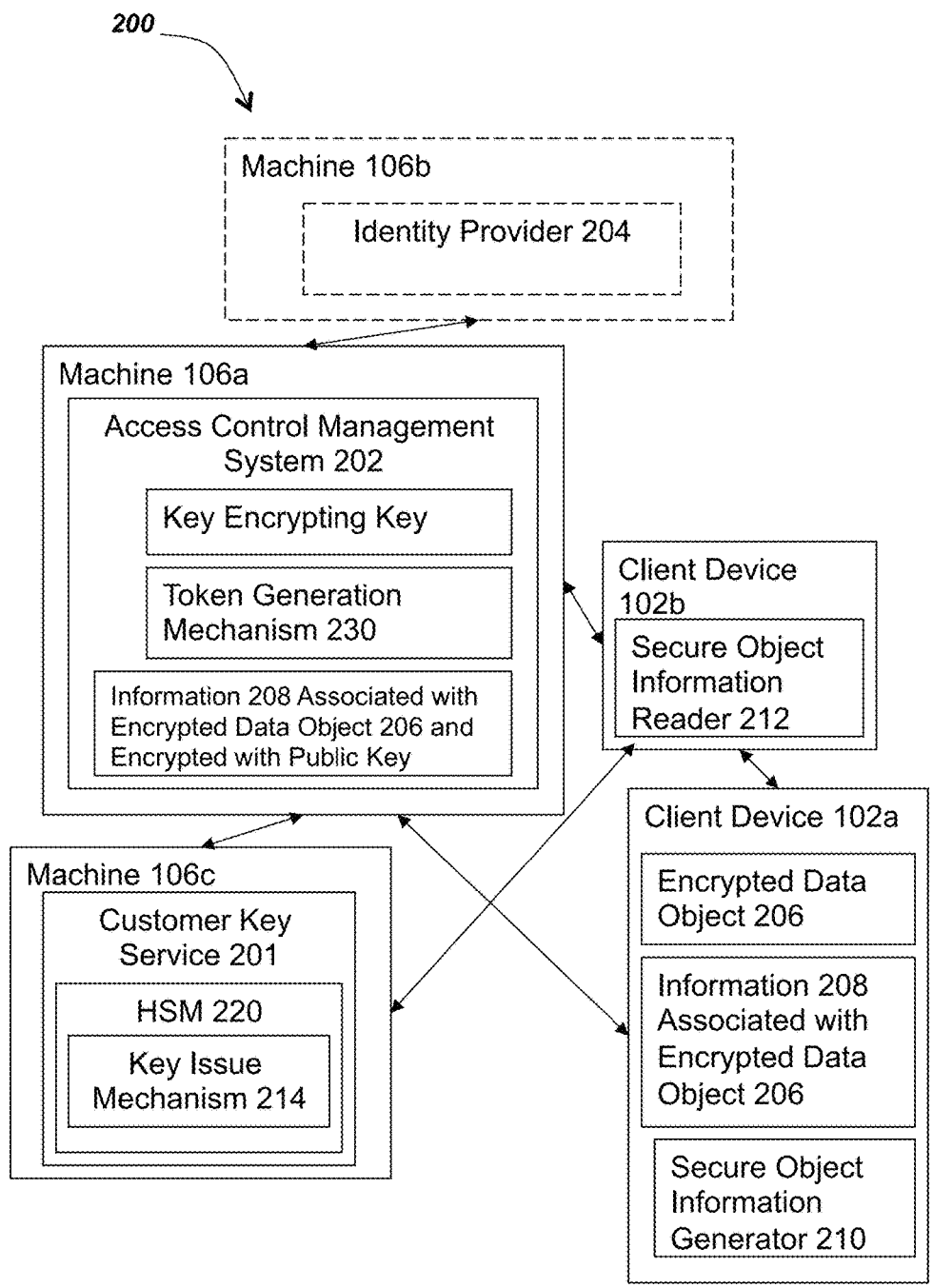
FIG. 5 is a block diagram depicting another embodiment of a system for distributing cryptographic data.

Referring now to FIG. 5, a block diagram depicts an embodiment of a system for distributing encrypted cryptographic information including a hardware security module (HSM) 220 for safeguarding and managing encryption keys. The HSM 220 may include the key issue mechanism 214 described above.

In one embodiment, a first client device 102a receives (i) a notification that an unauthorized user of a client device 102b has requested access to information 208 associated with an encrypted data object 206 and stored on an access control management system 202, and (ii) an identifier of the unauthorized user. In another embodiment, the first client device 102a authorizes the access control management system 202 to provide access to the information 208; the access control management system 202 receives the authorization to provide access. In still another embodiment, the access control management system 202 determines that the HSM 220 is on a network 104 to which the client device 102b has access. In yet another embodiment, the access control management system 202 instructs the HSM 220 to generate a public-private key pair and provide the private key to the client device 102b if the client device 102b provides the HSM 220 with a token generated by the access control management system 202. In another embodiment, the access control management system 202 issues a token to the client device 102b (e.g., using a token generation mechanism 230). In still another embodiment, the access control management system 202 receives the generated public key and encrypts the encryption key from within the information 208 with the generated public key. In another embodiment, the access control management system 202 provides the encrypted information 208 to the client device 102b. In still another embodiment, the HSM 220 receives, from the client device 102b, the generated token and a request for access to the private key. In yet another embodiment, the HSM 220 provides the client device 102b with the requested private key, which the client device 102b uses to unencrypt the encrypted information 208 (e.g., the encryption key needed to decrypt the encrypted data object 206).

In some embodiments, instead of contacting the HSM 220 directly, the client device 102b request for access to the private key is tunneled through the access control management system 202.

In another embodiment, the sending user transmits the information 208 to the access control management system 202 as described above in connection with FIGS. 2, 3A-B, and 4. The access control management system 202 may use a key encrypting key to encrypt an encryption key included in the information 208.

Figure 6:
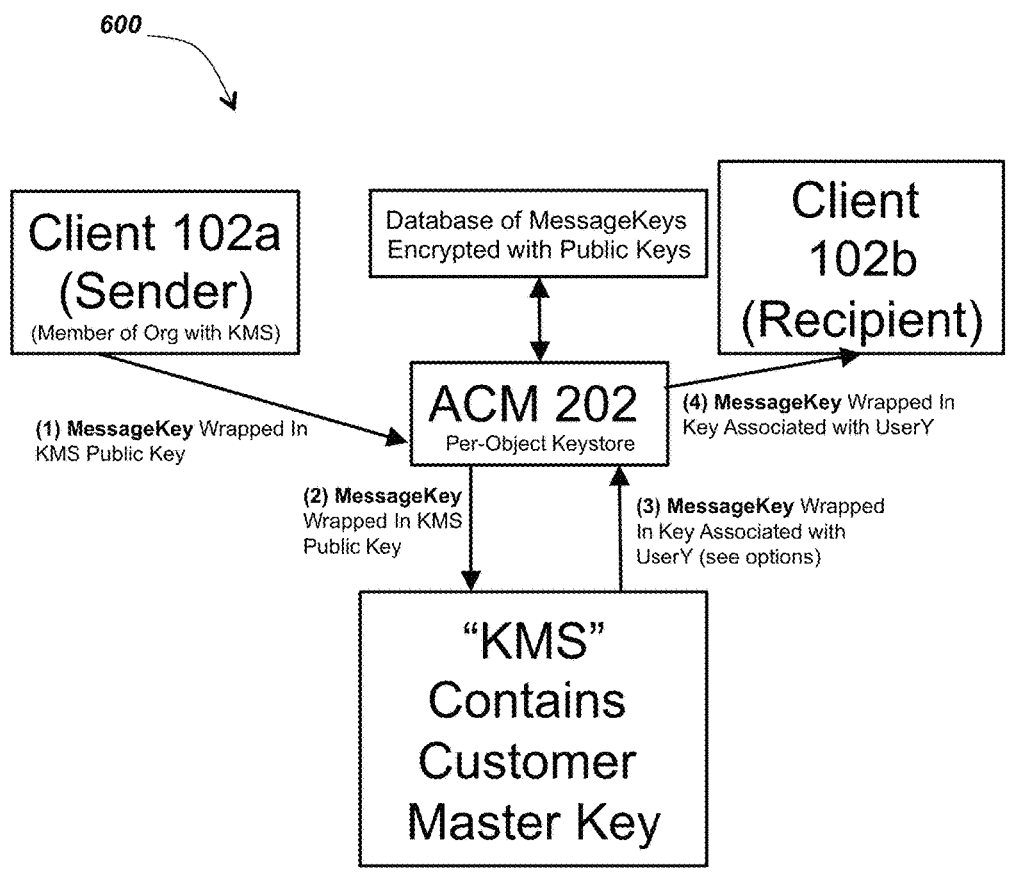
FIG. 6 is a block diagram depicting one embodiment of a system with a key management system key retargeting architecture.

Referring now to FIG. 6, a block diagram depicts one embodiment of a system 600 with a key management system key retargeting architecture. In one embodiment, the system 600 includes a sender (client 102a), an access control manager (ACM) 202 (including a per-object keystore), a database of message keys encrypted with public keys, a key management system (KMS) containing customer master keys and a recipient (client 102b).

In one embodiment, a per-message encryption key (referred to hereafter as a message key) is generated on the client 102a device, as described above. In another embodiment, the message key is wrapped in a key management system (KMS) public key. In still another embodiment, the ACM 202 receives the message key wrapped in the KMS public key. In one embodiment, the message key was wrapped in the KMS public key before transmission to the ACM 202, therefore the ACM 202 does not have access to the original message key. In another embodiment, the ACM 202 transmits the message key (wrapped in the KMS public key) to the KMS. The KMS may be a remotely located (e.g., "cloud-based") virtual software as a service system. Alternatively, the KMS may be located on-premise for a customer with which the client 102a is associated. The KMS may be a software module. The KMS may be a hardware module. The KMS may be HSM-backed. The KMS may be on dedicated HSM hardware. The system may leverage virtual machines (including either virtualized software, virtualized hardware, or a combination of the two) to implement the systems and methods described herein. The system may leverage HSMs to implement the systems and methods described herein. The KMS may be a key management service 201 as described above.

In one embodiment, the KMS may wrap the message key (which was wrapped in the KMS public key) with a recipient's public key, ensuring cryptographic audit of all transactions. A recipient (client 102b) may generate a public-private key pair and send the public key to the ACM 202. The recipient may alternatively submit its own, previously-generated, public key (e.g., a PGP key), which may be self-signed, Certificate Authority signed, or be an organizational public key. The recipient's public key may be dynamically generated per session (ephemeral user-and-device pair). The KMS may transmit to the ACM 202 the message key wrapped with the recipient's public key. The ACM 202 may transmit the message key wrapped in the key associated with the recipient to the recipient, who can then unwrap the message key.

Figure 7:
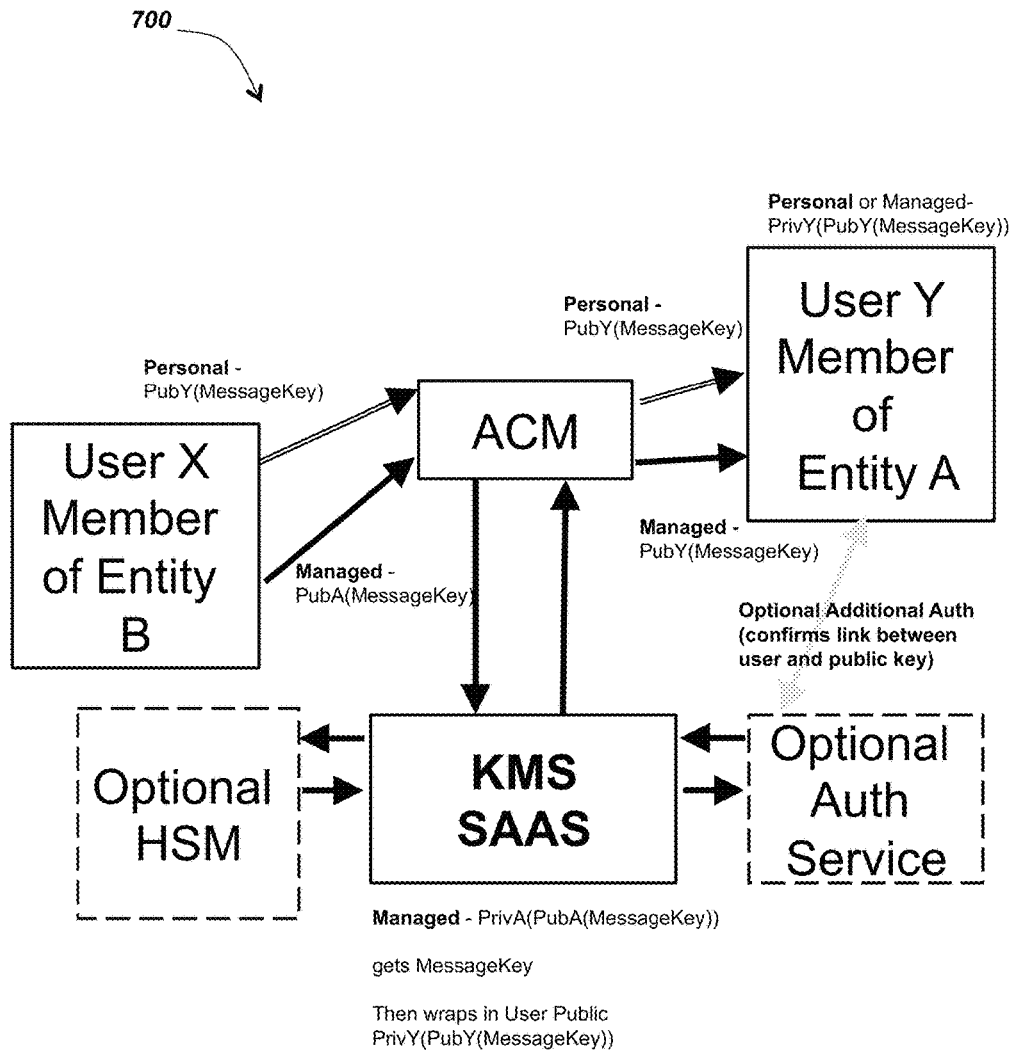
FIG. 7 is a block diagram depicting an embodiment of a system with a key management system key retargeting architecture.

FIG. 7 depicts an embodiment of a system 700 with a key management system key retargeting architecture. As depicted in FIG. 7, the KMS may be provided via a software as a service model (SAAS). The KMS may optionally access an HSM. The KMS may optionally access an authentication service to confirm a link between a recipient user and a public key. In one embodiment, a sender 102a (e.g., user X, member of Entity B) may transmit a personal message key to a recipient 102b (e.g., user Y, member of Entity A), via the ACM 202, wrapping the message key with a public key of the recipient; the ACM forwards the wrapped message key to the recipient who decrypts the message key using a private key that corresponds to the public key. In another embodiment, the sender 202 may utilize managed encryption services to send to the ACM 202 a message key wrapped in a public key of a key management service; the ACM 202 sends the wrapped message key to the KMS, which decrypts it using a corresponding private key and then encrypts the now-unencrypted encryption key using a public-private key pair available to the recipient (user Y) before returning the now-encrypted encryption key back to the ACM for forwarding to the recipient. Thus, although the sender does not have the public or private keys of a particular recipient, she may still securely transmit the encryption key to the recipient.

Figure 8:
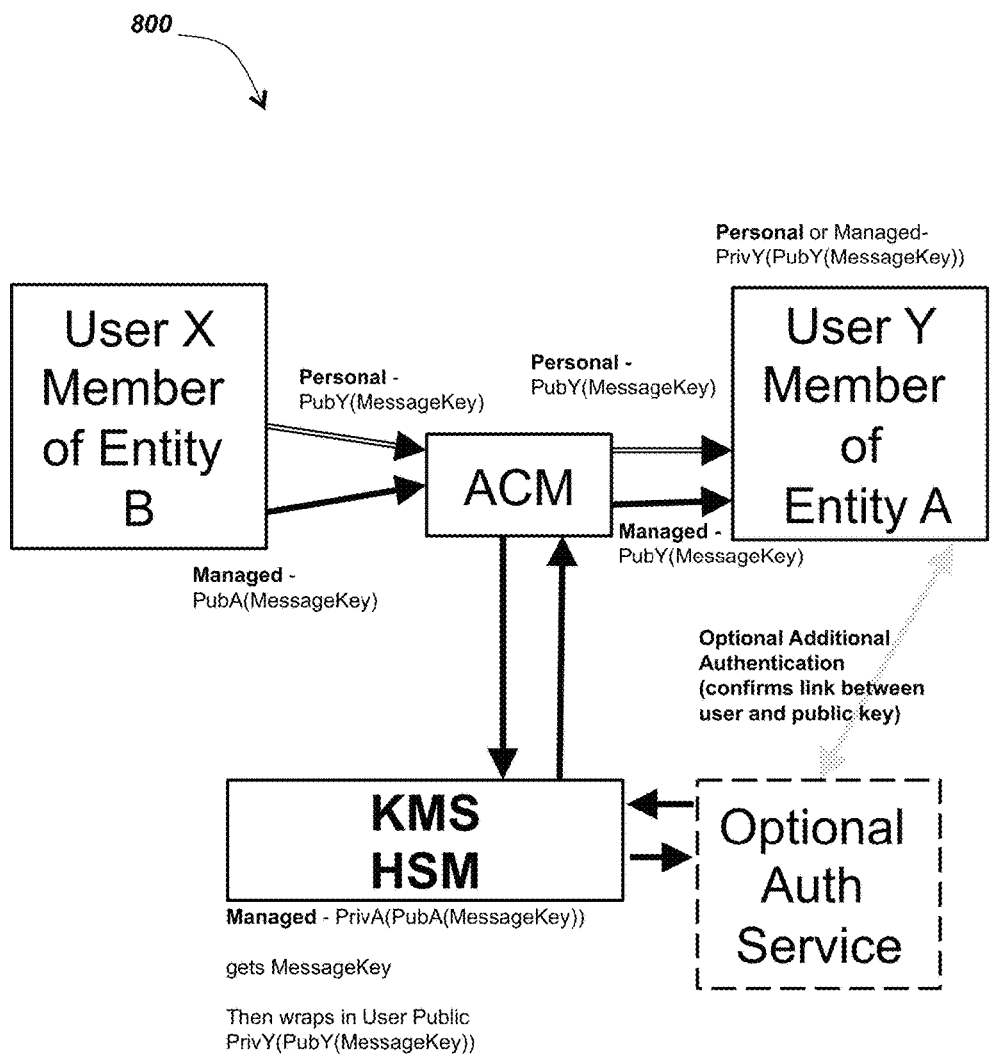
FIG. 8 is a block diagram depicting an embodiment of a system with a key management system key retargeting architecture.

FIG. 8 depicts an embodiment of a system 800 with a key management system key retargeting architecture. As depicted in FIG. 8, the KMS may include an HSM.

In some embodiments, the methods and systems described herein provide functionality for electronic file protection. In one embodiment, implementation of the methods and systems described herein provides functionality for coupling an access control management system with an identity provider, improving the ability of the access control management system to authenticate individuals requesting access to cryptographic data. In another embodiment, implementation of the methods and systems described herein provides functionality for decoupling an access control management system from a storage system, reducing a storage burden on the access control management system and increasing the flexibility the system provides to users who benefit from a decentralized storage system. In still another embodiment, implementation of the methods and systems described herein provides functionality for users to share encrypted data objects with individuals who do not have a pre-existing trust relationship with an access control management system or who have a pre-existing trust relationship with an access control management system other than the one used by the distributing user. In yet another embodiment, implementation of the methods and systems described herein provides functionality for creating secure data objects with access rights that are managed by an access control management system while authentication services are provided by a third-party identity provider, minimizing the administrative burden on the sender and receiver of secured data objects. In some embodiments, implementations of the methods and systems described herein allow consumers to exchange data securely using means with which typical computer users are familiar (i.e., email addresses and account passwords) to control (with a high degree of assurance and flexibility) access to the exchanged data.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for distributing encrypted cryptographic data, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for distributing encrypted cryptographic data comprises:

receiving, by a key service maintained by a first entity, from a first client device, a request for a first public key;

generating, by the key service, the first public key and a first private key corresponding to the first public key;

transmitting, by the key service, to the first client device, the first public key;

receiving, by the key service, from an access control management system maintained by a second entity separate from the first entity, an encryption key encrypted with the first public key and a request from a second client device for access to the encryption key encrypted with the first public key, the second client device identified by the first client device and receiving, from the first client device, a data object encrypted with the first public key;

decrypting, by the key service, the encryption key encrypted with the first public key, with the generated first private key corresponding to the first public key;

encrypting, by the key service, the decrypted encryption key, with a second public key received from the second computing device; and transmitting, by the key service, to the second client device, the encryption key encrypted with the second public key, wherein the method further comprises verifying, by the access control management system that a user of the second client device is identified in information received from the first client device and associated with an encrypted data object encrypted with the encryption key, and wherein the method further comprises automatically selecting, by the access control management system, an identity provider from a plurality of identity providers, based on a user identifier included in the received information associated with the encrypted data object, the user identifier associated with the user of the second client device, and wherein the method further comprises requesting, by the access control management system, from the selected identity provider, authentication of the user of the second client device, before the receiving, by the key service, of the encryption key encrypted with the first public key and the request from the second client device for access to the encryption key encrypted with the first public key.

2. The method of claim 1 further comprising receiving, by the key service, from the access control management system, an indication that a user of the second client device has been authenticated by an identity provider.

3. The method of claim 1 further comprising receiving, by the key service, from the access control management system, an indication that a user of the second client device has been authorized, by the first client device, to receive access to the encryption key encrypted with the first public key.

4. The method of claim 1 further comprising encrypting, by a key issue mechanism of the key service, an encryption key generated by the first client device with the first public key.

5. The method of claim 4 further comprising transmitting, by the key service, to the first client device, the encryption key encrypted with the first public key.

6. A non-transitory, computer readable medium comprising computer program instructions tangibly stored on the computer readable medium, wherein the computer program instructions are executable by at least one computer processor to perform a method, the method comprising:

receiving, by a key service maintained by a first entity, from a first client device, a request for a first public key;

generating, by the key service, the first public key and a first private key corresponding to the first public key;

transmitting, by the key service, to the first client device, the first public key;

receiving, by the key service, from an access control management system maintained by a second entity separate from the first entity, an encryption key encrypted with the first public key and a request from a second client device for access to the encryption key encrypted with the first public key, the second client device identified by the first client device and receiving, from the first client device, a data object encrypted with the first public key;

decrypting, by the key service, the encryption key encrypted with the first public key, with the generated first private key corresponding to the first public key;

encrypting, by the key service, the decrypted encryption key, with a second public key received from the second computing device; and transmitting, by the key service, to the second client device, the encryption key encrypted with the second public key, wherein the method further comprises verifying, by the access control management system that a user of the second client device is identified in information received from the first client device and associated with an encrypted data object encrypted with the encryption key, and wherein the method further comprises automatically selecting, by the access control management system, an identity provider from a plurality of identity providers, based on a user identifier included in the received information associated with the encrypted data object, the user identifier associated with the user of the second client device, and wherein the method further comprises requesting, by the access control management system, from the selected identity provider, authentication of the user of the second client device, before the receiving, by the key service, of the encryption key encrypted with the first public key and the request from the second client device for access to the encryption key encrypted with the first public key.

7. A system comprising:

a key service executing on a computer maintained by a first entity:

receiving, from a first client device, a request for a first public key;

generating, by the first key service, the first public key and a first private key corresponding to the first public key;

transmitting, to the first client device, the first public key;

receiving, from an access control management system maintained by a second entity separate from the first entity, an encryption key encrypted with the first public key and a request from a second client device for access to the encryption key encrypted with the first public key, the second client device identified by the first client device and receiving, from the first client device, a data object encrypted with the first public key;

decrypting, the encryption key encrypted with the first public key, with the generated first private key corresponding to the first public key;

encrypting, the decrypted encryption key, with a second public key received from the second computing device; and transmitting, to the second client device, the encryption key encrypted with the second public key; and an access control management: (i) verifying that a user of the second client device is identified in information received from the first client device and associated with an encrypted data object encrypted with the encryption key, and automatically selecting an identity provider from a plurality of identity providers, based on a user identifier included in the received information associated with the encrypted data object, the user identifier associated with the user of the second client device, and requesting, from the selected identity provider, authentication of the user of the second client device, before the receiving, by the key service, of the encryption key encrypted with the first public key and the request from the second client device for access to the encryption key encrypted with the first public key.

* * * * *